US006231988B1

(12) United States Patent
Kato et al.

(10) Patent No.: US 6,231,988 B1
(45) **Date of Patent: *May 15, 2001**

(54) LITHOGRAPHIC PRINTING PLATE PRECURSOR AND METHOD OF PREPARING LITHOGRAPHIC PRINTING PLATE USING THE SAME

(75) Inventors: Eiichi Kato; Seishi Kasai, both of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/152,922

(22) Filed: Sep. 14, 1998

(30) Foreign Application Priority Data

Sep. 18, 1997 (JP) .................................................. 9-253526
Oct. 9, 1997 (JP) .................................................. 9-277328

(51) Int. Cl.$^7$ .................................................. B32B 9/04

(52) U.S. Cl. .......................... 428/447; 428/328; 428/409; 430/49

(58) Field of Search .................................. 430/49, 270.1, 430/272.1, 302, 346; 428/195, 206, 323

(56) References Cited

U.S. PATENT DOCUMENTS 3,971,660 * 7/1976 Staehle .................................... 96/33
5,641,605 * 6/1997 Yoshida et al. ...................... 430/207
5,648,191 * 7/1997 Kato et al. ............................ 430/49

* cited by examiner

*Primary Examiner*—Bruce H. Hess
*Assistant Examiner*—Michael E. Grendzynski
(74) *Attorney, Agent, or Firm*—Reed Smith LLP

(57) ABSTRACT

A lithographic printing plate precursor comprising a water-proof support having thereon an image-receiving layer, wherein the image-receiving layer comprises at least anatase-type titanium oxide grains and a resin having a siloxane bond in which silicon atoms are linked via an oxygen atom, the surface of the image-receiving layer has at least 25 degrees of contact angle with water and the contact angle with water is reduced to 15 degrees or below when it is irradiated with ultraviolet light: and a method for preparing a lithographic printing plate from the aforesaid lithographic printing plate precursor, which comprises forming a colored image on the image-receiving layer of the printing plate precursor by utilizing an electrophotographic recording system or an ink jet recording system and desensitizing the image-receiving layer by overall irradiation with ultraviolet light to change the non-image area to a water-receptive surface.

7 Claims, 2 Drawing Sheets

LITHOGRAPHIC PRINTING PLATE PRECURSOR AND METHOD OF PREPARING LITHOGRAPHIC PRINTING PLATE USING THE SAME

FIELD OF THE INVENTION

The present invention relates to a lithographic printing plate precursor (also referred to as "a lithographic printing original plate hereinafter) and a method for preparing a lithographic printing plate using the printing original plate (i.e., the printing plate precursor) and, more particularly, to a lithographic printing original plate which enables to print a great number of printed matters having no scumming and having clear images and a method for preparing a lithographic printing plate using the aforesaid printing original plate by utilizing a heat-sensitive transfer recording system, an ink jet recording system or an electrophotographic recording system.

BACKGROUND OF THE INVENTION

The printing original plates for lithography which are used mainly in the filed of small-scale printing include (1) a direct draw type original plate having a hydrophilic image-receiving layer on a waterproof support, (2) an original plate having on a waterproof support an (lipophilic) image-receiving layer comprising zinc oxide, which is converted into a printing plate by undergoing direct draw plate-making and further desensitizing treatment with a desensitizing treatment solution for the non-image area, (3) an original plate of an electrophotographic light-sensitive material having on a waterproof support a photoconductive layer comprising photoconductive zinc oxide, which is converted into a printing plate by undergoing an image forming operation and further a desensitizing treatment with a desensitizing treatment solution for the non-image area, and (4) an original plate utilizing a silver-halide photographic material which has a silver halide emulsion layer on a waterproof support.

With the development of office appliances and the expansion of office automation in recent years, it has been desired in the field of graphic arts to adopt an offset lithographic printing system wherein the lithographic printing original plate of direct draw type (the foregoing type (1)) is made directly into a printing plate using some of various plate-making (image forming) means, e.g., an electrophotographic printer, a heat-sensitive transfer printer or an ink jet printer without undergoing any special treatments for conversion into a printing plate.

Further, another direct platemaking method of the printing plate wherein an electrophotographic printer is utilized has been proposed. More specifically, this method is adopted in the electronic editorial system wherein the input, correction, editing, layout and page make-up are performed by a continuous computer operation and the thus processed image information is instantly transmitted into terminal plotters in distant places via high-speed communication network or a communications satellite. In this system, a digital signal input adaptable electrophotographic printer is used as a terminal plotter, and printing plates are made directly from the output of the printer.

In particular, nowadays the ink jet recording method is spreading rapidly because it enables noiseless and high-speed printing.

With respect to the ink jet recording method, various ink jet recording systems, e.g., the so-called electric field control system which jets out ink by utilizing induced electrostatic force, the so-called drop-on-demand system (pressure pulse system) which jets out ink by utilizing oscillating pressure of piezo elements, and the so-called bubble (thermal) jet system which jets out ink by utilizing the pressure of bubbles produced and grown by means of high thermal energy have been proposed, and these systems can provide images of high accuracy.

In a conventional lithographic printing original plate of direct draw type, the support, such as paper, has on the both surface side an image-receiving layer which is a surface layer provided via an interlayer or an under(coat) layer. The under layer and the interlayer are each constituted of a water-soluble resin, such as PVA or starch, a water-dispersible resin, such as a synthetic resin emulsion, and a pigment. The image-receiving layer comprises an inorganic pigment, a water-soluble resin and a water resisting agent.

Examples of a hitherto used inorganic pigment include kaolin, clay, talc, calcium carbonate, silica, titanium oxide, zinc oxide, barium sulfate and alumina.

Examples of a hitherto used water-soluble resin include polyvinyl alcohol (PVA), modified PVA such as carboxylated PVA, starch and derivatives thereof, cellulose derivatives such as carboxymethyl cellulose and hydroxyethyl cellulose, casein, gelatin, polyvinyl pyrrolidone, vinyl acetate-crotonic acid copolymer, and styrene-maleic acid copolymer.

Examples of a hitherto used water resisting agent include glyoxal, initial condensates of aminoplasts such as melamine-formaldehyde resin and urea-formaldehyde resin, modified polyamide resins such as methylolated polyamide resin, polyamide-polyamine-epichlorohydrin adduct, polyamide epichlorohydrin resin, and modified polyamidepolyimide resin.

In addition to the above ingredients, it is also known that a cross-linking catalyst such as ammonium chloride or a silane coupling agent can also be combination-used.

Furthermore, for improving the printing durability of conventional printing plates made in the aforementioned manners, if the hydrophobicities of those printing plates are enhanced by adding a water resisting agent in a large amount or by using a hydrophobic resin, the scum due to the lowering of water wettability (affinities of the plates for water) is generated although the press life is improved; while the enhancement of water wettability (affinities of the plates for water) results in the lowering of water resistance to cause deterioration of press life.

In particular, when those printing plates are used under a temperature condition of 30° C. or more, they have a defect that the surface layer thereof are dissolved in a fountain solution used for offset printing to result in deterioration of press life and generation of scum. Moreover, since the images are drawn directly on the image-receiving layer of the printing original plate with oil-based ink in the case of direct draw lithography, poor adhesion of the oil-based ink to the image-receiving layer causes the ink to come off the image area during printing operations, thereby deteriorating the press life even if the non-image area does not generate scum because of sufficient water wettability. This problem does not yet come to a satisfactory solution.

With respect to the ink used for forming images on a conventional lithographic printing original plate of direct draw type in accordance with an ink jet recording system, water-based ink which uses water as the main solvent and oil-based ink which uses an organic solvent as the main solvent are generally used.

However, the water-based ink has drawbacks of blurring the images on the plate and causing a decrease of drawing speed due to slow drying. With the intention of mitigating such drawbacks, the method of using oil-based ink using a nonaqueous solvent as dispersing medium is disclosed in JP-A-54-117203 (the term "JP-A" as used herein means an "unexamined published Japanese patent application").

Even when such a method is adopted, however, image blur is actually observed on a plate-made image obtained, and further blur is generated upon printing. In addition, the number of printed matter producible with the printing plate is of the order of several hundreds at the most, so it is far below the required level. Moreover, the foregoing ink has a problem of being apt to clog up a nozzle for jetting out so fine ink drops as to form plate-made images of high resolution.

In the ink jet recording system, the ink is generally passed through a filter and then jetted out from a nozzle. Thus, this system tends to cause ink jet troubles attributable to various factors such that the nozzle is liable to be clogged up, the filter is liable to be stuffed up, the ink-fluidity changes with the lapse of time, and so on.

Such ink jet troubles are caused by not only water-based ink compositions but also oil-based ink compositions. For improving the ink jet troubles, various proposals have been submitted. For instance, for preventing those ink jet troubles in the case of using an oil-based ink composition in the ink jet recording system of electric field control type, JP-A-49-50935 proposes controlling the viscosity and the specific resistance of the ink composition, and JP-A-53-29808 proposes controlling the specific resistance and the dielectric constant of a solvent used for the ink composition.

Further, as attempts to prevent clogging of the nozzle due to oil-based ink for a printer in the ink jet recording system, the methods of improving the dispersion stability of pigment particles (described in JP-A-4-25573, JP-A-5-25413, and JP-A-5-65443), the methods of incorporating particular compounds in ink compositions (described in JP-A-3-79677, JP-A-3-64377, JP-A-4-202386, JP-A-7-109431) have been proposed.

However, even if any of the ink compositions improved by those methods is used for image formation on the printing original plate, the images formed suffer from insufficiency of strength upon printing, so the resulting lithographic printing plate cannot have a satisfactory press life.

On the other hand, in the case of adopting the platemaking method wherein images are formed on the printing original plate having a zinc oxide-containing image-receiving layer by the use of a heat-sensitive transfer recording system, an ink jet recording system or an electrophotographic recording system, and then the non-image area is treated with a desensitizing solution, the image of plate-made printing plate and printed matter have good quality and a great number of printed matters having good quality can be provided. However, this method has the complication in wet processing. For example, it is essential for the method to use a desensitizing solution in the course of platemaking and a fountain solution containing the same desensitizing component as the desensitizing solution at the time of printing. In addition, it occurs, though depends on the printing ink used, that the foregoing component in the fountain solution used has interaction with some component in the printing ink to result in staining the printed matter. Thus, this method has a problem of being unsuitable for the color printing with a wide variety of printing inks.

In the field of digital adaptable electrophotographic printers, remarkable technical improvements have been made lately. For instance, the reproduction of high resolution image have been achieved by an electrophotographic printer using fine dry toner having a particle size of 6 to 8 μm, and the reproduction of highly precise images with a high reproducibility have been achieved by an electrophotographic printer using liquid toner.

In drawing images on a printing original plate of direct draw type by image transfer using, e.g., a laser printer of such a system as mentioned above, therefore, it is required that both prevention of scumming in the non-image area after transfer and high image reproducibility in the image area be achieved to provide printed matters having clear images and no scumming, in great numbers. Further, it is desired that printed matter having a wide variety of color images be easily obtained.

Furthermore, it is requested to simply carry out a desensitizing treatment for the non-image area in the preparation of the printing plate.

SUMMARY OF THE INVENTION

The present invention aims to improve upon the aforementioned conventional platemaking methods which utilize an electrophotographic or ink jet recording system, and to solve the problems confronting those methods.

Therefore, one object of the present invention is to provide a method for preparing a lithographic printing plate by utilizing an electrophotographic recording system or an ink jet recording system, which enables the lithographic printing plate to produce a great number of clear printed matters free from scumming and having neither loss nor distortion of images.

Another object of the present invention is to provide a lithographic printing plate precursor which undergoes a dry processing for desensitization to enable the lithographic printing plate made therefrom to generate no scumming and to produce a great number of clear printed matters even when various kinds of printing ink are used.

A further object of the present invention is to provide a method for preparing a lithographic printing plate by utilizing a liquid toner-used electrophotographic recording system or by utilizing the electrostatic jet type ink jet recording system wherein oil-based ink is used, which enables the lithographic printing plate to produce a great number of clear printed matters having neither scumming nor image blur.

Still another object of the present invention is to provide a method for preparing a lithographic printing plate by utilizing an ink jet recording system, which enables the ink jet recording to be performed consistently stably and ensures excellent press life in the lithographic printing plate even when the printing plate is used repeatedly.

The above-described objects of the present invention are attained by the following constitutions (1) to (3):

(1) A lithographic printing plate precursor comprising a waterproof support having thereon an image-receiving layer, wherein the image-receiving layer comprises at least anatase-type titanium oxide grains and a resin having a siloxane bond in which silicon atoms are linked via an oxygen atom, the surface of the image-receiving layer has at least 25 degrees of contact angle with water and the contact angle with water is reduced to 15 degrees or below when it is irradiated with ultraviolet light.

(2) A method for preparing a lithographic printing plate from a lithographic printing plate precursor having an image-receiving layer on a-waterproof support;

wherein said image-receiving layer comprises at least anatase-type titanium oxide grains and a resin having a siloxane bond in which silicon atoms are linked via an oxygen atom, and which comprises a step of forming a colored toner image on said image-receiving layer by utilizing an electrophotographic recording system and then a step of irradiating the whole surface of the image-receiving layer with ultraviolet light to change a non-image area to a water-receptive surface which receives no printing ink.

(3) A method for preparing a lithographic printing plate from a lithographic printing plate precursor having an image-receiving layer on a waterproof support;

wherein the image-receiving layer comprises at least anatase-type titanium oxide grains and a resin having a siloxane bond in which silicon atoms are linked via an oxygen atom, and which comprises a step of forming a colored image on said image-receiving layer by utilizing an ink jet recording system and then a step of irradiating the whole surface of the image-receiving layer with ultraviolet light to change a non-image area to a water-receptive surface which receives no printing ink.

Further, the following are preferred embodiments of the forgoing constitution (1):

(1-1) The lithographic printing plate precursor as described in the constitution (1), wherein the image-receiving layer has a surface smoothness of at least 30 seconds/10 ml measured in the term of a Bekk smoothness degree.

(1-2) The lithographic printing plate precursor as described in the constitution (1), wherein the image-receiving layer is a layer formed from a dispersion containing anatase-type titanium oxide particles and at least one silyl compound represented by formula (I) with a sol-gel method:

$$(R^0)_nSi(Y)_{4-n} \quad (I)$$

wherein $R^0$ represents a hydrocarbon group or a heterocyclic group; Y represents a hydrogen atom, a halogen atom, $—OR^1$, $—OCOR^2$ or $—N(R^3)(R^4)$, wherein $R^1$ and $R^2$ are each a hydrocarbon group, and $R^3$ and $R^4$ may be the same or different, each represents a hydrogen atom or a hydrocarbon group; and n is 0, 1, 2 or 3.

(1-3) The lithographic printing plate precursor as described in the constitution (1), which is a printing original plate for forming an image with an electrophotographic recording system.

(1-4) The lithographic printing plate precursor as described in the constitution (1), which is a printing original plate for forming an image with an ink jet recording system.

(1-5) The lithographic printing plate precursor as described in the embodiment (1-3), wherein the printing plate precursor has a waterproof support having a specific electric resistance of from $10^4$ to $10^{13}$ Ω·cm in at least the part just under the image-receiving layer.

(1-6) The lithographic printing plate precursor as described in the embodiment (1-4), wherein the printing plate precursor has a waterproof support having a specific electric resistance of not higher than $10^{10}$ Ω·cm in the part just under the image-receiving layer.

The following is a preferred embodiment of the forgoing constitution (2):

(2-1) The method for preparing a lithographic printing plate as described in the constitution (2), wherein the image formation utilizing an electrophotographic recording system is carried out with a liquid developer.

The following are preferred embodiments of the forgoing constitution (3):

(3-1) The method for preparing a lithographic printing plate as described in the constitution (3), wherein the image formation utilizing an ink jet recording system is carried out by jetting oil-based ink liquid-dropwise from a nozzle.

(3-2) The method for preparing a lithographic printing plate as described in the embodiment (3-1), wherein the oil-based ink comprises a nonaqueous solvent having a specific resistance of $10^9$ Ω·cm or more and a dielectric constant of 3.5 or below and colored or colorless hydrophobic resin particles dispersed therein which are solid at ordinary temperature, and further colored particles when the resin particles are colorless.

(3-3) The method for preparing a lithographic printing plate as described in the embodiment (3-1), wherein the particles dispersed in the oil-based ink are positively or negatively charged particles and the oil-based ink is jet out of the nozzle by utilizing an electrostatic field.

(3-4) The method for preparing a lithographic printing plate as described in the constitution (3), wherein the waterproof support has a specific electric resistance of $10^{10}$ Ω·cm or below in at least the part just unnder the image-receiving layer.

Figure 1:
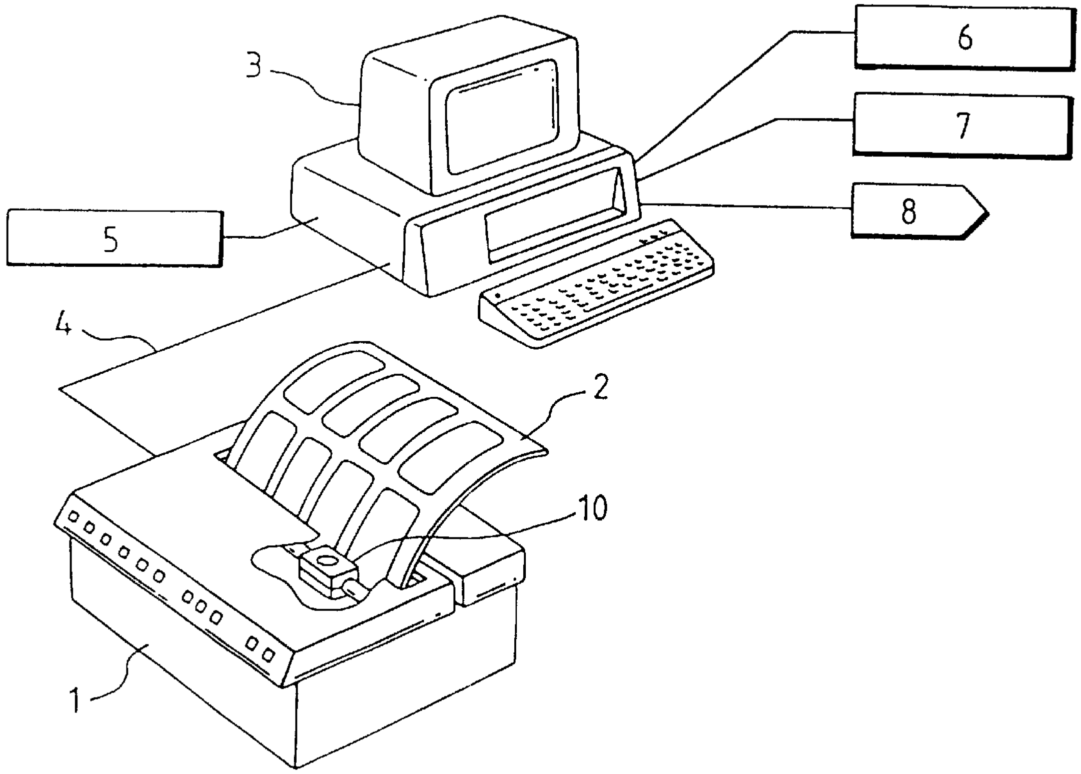
FIG. 1 is a schematic view showing an example of an apparatus employed in the present invention.

In these figures, the numerals symbolize the following members respectively:

1, Ink jet recording system apparatus
2, Lithographic printing original plate (Master)
3, Computer
4, Bus
5, Video camera
6, Hard disk
7, Floppy disk
8, Mouse
10, Head
10*a,* Jet slit
10*b,* Electrode for jetting out ink
10*c,* Counter electrode
11, Oil-based ink
101, Upper unit
102, Lower unit

DETAILED DESCRIPTION OF THE INVENTION

The practical embodiment of the present invention are described below in detail.

The present invention is characterized in that colored images are formed on a lithographic printing original plate by utilizing an electrophotographic recording system or an ink jet recording system, and then the printing original plate is irradiated all over with ultraviolet light to change the non-image area to have water-receptive surface, thereby preparing a lithographic printing plate. And the lithographic printing original plate used in the present invention can ensure sufficient strength in the images formed thereon, and does not generate scumming on the non-image area thereof which is subjected to water-receptive treatment. The thus obtained lithographic printing plate can provide a great number of clear printed matters.

The lithographic printing original plates according to the present invention are illustrated below in detail.

The present image-receiving layer which is provided on a waterproof support is in thre lithographic printing original plate mainly comprises anatase-type titanium oxide grains and a resin having a siloxane bond in which silicon atoms are linked via an oxygen atom.

The suitable Bekk smoothness of the image-receiving layer surface is preferably at least 30 (sec/10 ml) and more preferably from 60 to 2,000 (sec/10 ml).

The term “Bekk smoothness” as used herein meanss the surface smoothness in the term of a Bekk smoothness degree measured by a Bekk smoothness tester. In the Bekk smoothness tester, a sample piece is pressed against a circular glass plate having-a highly smooth finish and a hole at the center while applying thereto a definite pressure (1 kg/cm$^2$), and a definite volume (10 ml) of air is forced to pass between the sample piece and the glass surface under reduced pressure. Under this condition, a time (expressed in second) required for the air passage is measured.

In a case where images are formed on an original printing plate by means of an electrophotographic printer, the appropriate range of the Bekk smoothness depends on whether the toner used in the electrophotographic printer is dry toner or liquid toner.

More specifically, in the case of using dry toner in the electrophotographic printer, it is desirable that the Bekk smoothness of the present image-receiving layer surface be preferably from 30 to 200 (sec/10 ml), more preferably from 50 to 150 (sec/10 ml). When the Bekk smoothness of the present printing original plate on the surface side is in the foregoing range, the adhesion of scattered toner to the non-image area (or scum) does not occur and the toner is attached uniformly and firmly to the image area in the process of transferring and fixing the toner image to the printing original plate, and thereby the satisfactory reproduction of thin lines and fine characters and the uniformity in the solid image area can be achieved.

In the case of using liquid toner in the electrophotographic printer, it is desirable for the image-receiving layer surface to have a Bekk smoothness of at least 30 (sec/10 ml), and the toner images transferred and fixed thereto can have better quality the higher the Bekk smoothness is. Specifically, the suitable range thereof is preferably from 150 to 3,000 (sec/10 ml), particularly preferably from 500 to 2,500 (sec/10 ml).

When the Bekk smoothness is in the foregoing range, highly precise toner images can be transferred faithfully to the image-receiving layer, and fixed thereto so firmly as to ensure sufficient strength in the image area.

Further, the present printing original plate requires that the contact angle of the image-receiving layer with water be at least 25 degrees, preferably from 30 to 120 degrees, more preferably from 40 to 100 degrees.

By adjusting the contact angle to the foregoing range, the ink image or toner image formed by utilizing an ink jet recording system or an electrophotographic recording system respectively adheres satisfactorily to the image-receiving layer; as a result, the resulting printing plate can inhibit the image area from coming off when it undergoes continuous printing operation.

Further, the present image-receiving layer is characterized in that, when the image-receiving layer is irradiated with ultraviolet light, the aforementioned hydrophobic surface condition of the non-image area is converted into a hydrophilic surface condition having the contact angle with water being preferably not greater than 15 degrees, more preferably not greater than 10 degrees, most preferably not greater than 5 degrees.

Furthermore, the present printing original plate is characterized in that, even after the printing plate made receptive to water in the non-image area is allowed to stand for a long time, the water-receptive condition is fully retained.

The titanium oxide grains used in the present invention comprises those having the crystal structure of anatase type, and is characterized by undergoing photoexcitation upon irradiation with ultraviolet light to acquire water receptivity of such a degree that the contact angle between the particle surface and water is not greater than 15 degrees.

The details of the surface conversion phenomenon from the hydrophobic condition to the hydrophilic condition (or water-receptive condition) by irradiation with light are described, e.g., in Toshiya Watanabe, *Ceramics,* vol. 31, No. 10, p. 837 (1966).

The suitable average particle size of anatase-type titanium oxide grain is preferably from 5 to 500 nm, more preferably from 5 to 100 nm. In this range, the particle surface can obtain an appropriate water receptivity by irradiation with ultraviolet light.

The anatase-type titanium oxide grains comprise titanium oxide grains having the anatase-type crystal structure in a proportion of at least 30% by weight, more preferably at least 50% by weight, based on the total anatase-type titanium oxide grains.

These grains are commercially available as a powder or a titania sol dispersion produced, e.g., by Ishihara Sangyo Kaisha, Ltd., Titan Kogyo Kabushiki Kaisha, Sakai Chemical Industry Co., Ltd., Japan Aerosil Inc., or Nissan Chemical Industries, Ltd.

Further, the anatase-type titanium oxide grains used in the present invention may contain further other metallic elements or oxides thereof. The term “contain” used herein includes the meanings of “cover the particle surface” and/or “carry in the inner part”, or “dope in the inner part”.

Examples of the other metallic element which may be contained in the present titanium oxide grains include Si, Mg, V, Mn, Fe, Sn, Ni, Mo, Ru, Rh, Re, Os, Cr, Sb, In, Ir, Ta, Nb, Cs, Pd, Pt and Au. The concrete examples are described, e.g., in JP-A-7-228738, JP-A-7-187677, JP-A-8-81223, JP-A-8-257399, JP-A-8-283022, JP-A-9-25123, JP-A-9-71437 and JP-A-9-70532.

The proportion of the-other metallic element which may be contained in the present anatase-type titanium oxide grains is preferably not more than 10% by weight, more preferably not more than 5% by weight, based on the total anatase-type titanium oxide grains.

As another constituent, the present image-receiving layer may contain inorganic pigment particles other than the present anatase-type titanium oxide grains. Examples of such an inorganic pigment particles include silica, alumina, kaolin, clay, zinc oxide, calcium carbonate, barium carbonate, calcium sulfate, barium sulfate, magnesium carbonate, and titanium oxide having a crystal structure other than the anatase type. These inorganic pigments are used in a proportion of preferably less than 40 parts by weight, more preferably not more than 30 parts by weight, based on the present anatase-type titanium oxide grains.

In the resins used in the present image-receiving layer, the main component thereof is a polysiloxane resin having a siloxane bond in which silicon atoms are linked via an oxygen atom.

When the image-receiving layer is formed utilizing such a polysiloxane resin, especially with a sol-gel method, the image-receiving layer formed can have advantages in high film-strength and homogeneous dispersion of titanium oxide grains.

Examples of the polysiloxane resin include those having a bond of siloxane units represented by formula (II):

(II)

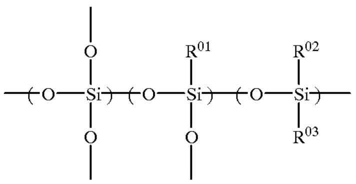

wherein $R^{01}$ to $R^{03}$ each represents an organic residue selected from the groups represented by $R^0$ in formula (I).

Preferably, the present image-receiving layer is formed from a dispersion comprising anatase-type titanium oxide grains and at least one silyl compound of formula (I) with a sol-gel method:

$$(R^0)_nSi(Y)_{4-n} \quad (I)$$

wherein $R^0$ represents a hydrocarbon group or a heterocyclic group; Y represents a hydrogen atom, a halogen atom or a group of formula —$OR^1$, —$OCOR^2$ or —$N(R^3)(R^4)$, wherein $R^1$ and $R^2$ each represents a hydrocarbon group, and $R^3$ and $R^4$ may be the same or different, each represents a hydrogen atom or a hydrocarbon group, and n is 0, 1, 2 or 3.

In the above formula (I), preferably, examples of the group represented by for $R^0$ include an unsubstituted or substituted straight-chain or branched alkyl group having 1 to 12 carbon atoms [e.g., methyl, ethyl, propyl, butyl, pentyl, hexyl, heptyl, octyl, nonyl, decyl and docecyl groups, which each may have one or more substituents, such as a halogen atom (e.g., chlorine, fluorine, bromine), a hydroxyl group, a thiol group,.a carboxyl group, a sulfo group, a cyano group, an epoxy group, a —OR' group (wherein R' is methyl, ethyl, propyl, butyl, heptyl, hexyl, octyl, decyl, propenyl, butenyl, hexenyl, octenyl, 2-hydroxyethyl, 3-chloropropyl, 2-cyanoethyl, N,N-dimethylaminoethyl, 2-bromoethyl, 2-(2-methoxyethyl)oxyethyl, 2-methoxycarbonylethyl, 3-carboxypropyl or benzyl), a —OCOR" group (wherein R" has the same meaning as R'), a —COOR" group, a —COR" group, a —$NR'''_2$ group (wherein R''' groups are each a hydrogen atom or the same group as R', and they may be the same or different), a —NHCONHR" group, a —NHCOOR" group, a —$SiR''_3$ group, a —CONHR''' group and a —NHCOR" group]; an unsubstituted or substituted straight-chain or branched alkenyl group having 2 to 12 carbon atoms [e.g., vinyl, propenyl, butenyl, pentenyl, hexenyl, octenyl, decenyl and dodecenyl groups, which each may have one or more substituents which is the same substituent (s) as described for the foregoing alkyl group]; an unsubstituted or substituted aralkyl group having 7 to 14 carbon atoms [e.g., benzyl, phenetyl, 3-phenylpropyl, naphthylmethyl and 2-naphthylethyl groups, which each may have one ore more substituents which is the same substituent(s) as described for the foregoing alkyl group]; an unsubstituted or substituted alicyclic group having 5 to 10 carbon atoms [e.g., cyclopentyl, cyclohexyl, 2-cyclohexylethyl, 2-cyclopentylethyl, norbornyl and adamantyl groups, which each may have one or more substituents which is the same substituent(s) as described for the foregoing alkyl group]; an unsubstituted or substituted aryl group having 6 to 12 carbon atoms [e.g., phenyl and naphthyl groups, which each may have one or more substituents which is the same substituent (s) as described for the foregoing alkyl group]; or an unsubstituted or substituted heterocyclic group which may be ring-condensed, containing at least one atom selected from nitrogen, oxygen or sulfur atom [examples of the hetero ring include an unsubstituted or substituted pyran, furan, thiophene, morpholine, pyrrole, thiazole, oxazole, pyridine, piperidine, pyrrolidone, benzothiazole, benzoxazole, quinoline or tetrahydrofuran ring, which may have one or more substituentd which is the same substituent (s) as described for the foregoing alkyl group].

Examples of the group represented by Y in formula (I) include a halogen atom (namely fluorine, chlorine, bromine or iodine atom), or a group of formula —$OR^1$, —$OCOR^2$ or —$NR^3R^4$.

In the group of —$OR^1$, $R^1$ represents an unsubstituted or substituted aliphatic group having 1 to 10 carbon atoms (e.g., methyl, ethyl, propyl, butoxy, heptyl, hexyl, pentyl, octyl, nonyl, decyl, propenyl, butenyl, heptenyl, hexenyl, octenyl, decenyl, 2-hydroxyethyl, 2-hydroxypropyl, 2-methoxyethyl, 2-(methoxyethyloxo)ethyl, 2-(N,N-diethylamino)ethyl, 2-methoxypropyl, 2-cyanoethyl, 3-methyloxapropyl, 2-chloroethyl, cyclohexyl, cyclopentyl, cyclooctyl, chlorocyclohexyl, methoxycyclohexyl, benzyl, phenetyl, dimethoxybenzyl, methylbenzyl, bromobenzyl).

In the group of —$OCOR^2$, $R^2$ represents the same aliphatic group as in $R^1$, or an unsubstituted or substituted aromatic group having 6 to 12 carbon atoms (e.g., the same aryl groups as described for the forgoing $R^0$).

In the group of —$NR^3R^4$, $R^3$ and $R^4$ may be the same or different, and they are each a hydrogen atom or an unsubstituted or substituted aliphatic group having 1 to 10 carbon atoms (e.g., the same groups as described for $R^1$ in the foregoing group —$OR^1$).

More preferably, the total carbon atoms contained in $R^1$ and $R^2$ are 16 or less.

Examples of a silane compound represented by formula (I) include methyltrichlorosilane, methyltribromosilane, methyltrimethoxysilane, methyltriethoxysilane, methyltriisopropoxysilane, methyltri(t-butoxy)silane, ethyltrichlorosilane, ethyltribromosilane, ethyltrimethoxysilane, ethyltriethoxysilane, ethyltriisopropoxysilane, ethyltri(t-butoxy)silane, n-propyltrichlorosilane, n-propyltribromosilane, n-propyltrimethoxysilane, n-propyltriethoxysilane, n-propyltriisopropoxysilane, n-propyltri(t-butoxy)silane, n-hexyltrichlorosilane, n-hexyltribromosilane, n-hexyltrimethoxysilane, n-hexyltriethoxysilane, n-hexyltriisopropoxysilane, n-hexyltri(t-butoxy)silane, n-decyltrichlorosilane, n-decyltribromosilane, n-decyltrimethoxysilane, n-decyltriethoxysilane, n-decyltriisopropoxysilane, n-decyltri(t-butoxysilane), n-octadecyltrichlorosilane, n-octadecyltribromosilane, n-octadecyltrimethoxysilane, n-octadecyltriethoxysilane, n-octadecyltriisopropoxysilane, n-octadecyltri(t-butoxy) silane, phenyltrichlorosilane, phenyltribromosilane, phenyltrimethoxysilane, phenyltriethoxysilane, phenyltriisopropoxysilane, phenyltri(t-butoxy)silane, tetrachlorosilane, tetrabromosilane, tetramethoxysilane, tetraethoxysilane, tetraisopropoxysilane, tetrabutoxysilane, dimethoxydiethoxysilane, dimethyldichlorosilane, dimethyldibromosilane, dimethyldimethoxysilane, dimethyldiethoxysilane, diphenyldichlorosilane, diphenyldibromosilane, diphenyldimethoxysilane, diphenyldiethoxysilane, phenylmethyldichlorosilane, phenylmethyldibromosilane, phenylmethyldimethoxysilane, phenylmethyldiethoxysilane, triethoxyhydrosilane, tribromohydrosilane, trimethoxyhydrosilane, triisopropoxyhydrosilane, tri(t-butoxy)hydrosilane, vinyltrichlorosilane, vinyltribromosilane, vinyltrimethoxysilane, vinyltriethoxysilane, vinyltriisopropoxysilane, vinyltri(t-butoxy)silane, trifluoropropyltrichlorosilane, trifluoropropyltribromosilane, trifluoropropyltrimethoxysilane, trifluoropropyltriethoxysilane, trifluoropropyltriisopropoxysilane, trifluoropropyltri (t-butoxy)silane, γ-glycidoxypropylmethyldimethoxysilane γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri (t-butoxy)silane, γ-methacryloxypropylmethyldimethoxysilane, γ-methacryloxypropylmethyldiethoxysilane, γ-methacryloxypropylmethoxysilane, γ-methacryloxypropyltriisopropoxysilane, γ-methacryloxypropyltri(t-butoxy)silane, γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyltri(t-butoxy)silane, γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyltri (t-butoxy)silane, β-(3,4-epoxycyclohexyl) ethyltrimethoxysilane and β-(3,4-epoxycyclohexyl) ethyltriethoxysilane.

However, it should be understood that these examples are not to be construed as limiting the scope of the invention in any way.

In combination with silane compounds represented by formula (I) that are used for the formation of the present image-receiving layer, metallic compounds capable of forming film by a sol-gel method, such as Ti, Zn, Sn, Zr and Al compounds, can be employed. Examples of a metallic compound usable in combination include Ti(OR") (wherein R" is methyl, ethyl, propyl, butyl, pentyl, hexyl or like group), $TiCl_4$, $Zn(OR")_2$, $Zn(CH_3COCHCOCH_3)_2$, $Sn(OR")_4$)$Sn(CH_3COCHCOCH_3)_4$, $Sn(OCOR")_4$, $SnCl_4$, $Zr(OR")_4$, $Zr(CH_3COCHCOCH_3)_4$ and Al(OR").

Such metallic compounds can be used in a proportion of preferably not higher than 20 mole %, more preferably not higher than 10 mole %, based on the silane compounds used together.

In the present image-receiving layer, it is desirable that the ratio of the anatase-type titanium oxide grains to the resin having siloxane bonds be preferably from 45/55 to 90/10 by weight, more preferably from 60/40 to 80/20 by weight.

In this range, the film-strength of the image-receiving layer and the water wettability of the surface after irradiation with ultraviolet light can be remained satisfactorily during printing, and thereby a great number of scum-free clear printed matters can be produced.

The present image-receiving layer is preferably formed using a sol-gel method. The sol-gel method adopted in the present invention may be any of conventionally well-known methods.

More specifically, the present image-receiving layer can be formed using the methods described in detail, e.g., Sumio Sakibana, *Science of Sol-Gel Method,* Agne Showfu-sha (1988), and Seki Hirashima, *Latest Arts of Functional Thin Film Formation using Sol-Gel Method,* Sogo Gijutu Center (1992).

In a coating solution for the image-receiving layer, water is used as a solvent, and further incorporated with a water-soluble solvent in order to prevent the precipitation upon preparation of the coating solution, thereby effecting homogenous liquefaction. Examples of such a water-soluble solvent include alcohols (such as methanol, ethanol, propyl alcohol, ethylene glycol, diethylene glycol, propylene glycol, dipropylene glycol, ethylene glycol monomethyl ether, propylene glycol monomethyl ether and ethylene glycol monoethyl ether), ethers (such as tetrahydrofuran, ethylene glycol dimethyl ether, propylene glycol dimethyl ether and tetrahydrofuran), ketones (such as acetone, methyl ethyl ketone and acetylacetone), esters (such as methyl acetate and ethylene glycol monomethylmonoacetate) and amides (such as formamide, N-methylformamide, pyrrolidone and N-methylpyrrolidone). These solvents may be used as a mixture of two or more thereof.

In the coating solution, it is desirable to further use an acidic or basic catalyst for the purpose of accelerating the hydrolysis and polycondensation reaction of the silane compounds represented by formula (I) and the foregoing metallic compounds used in combination therewith.

The catalyst used for the above purpose is an acidic or basic compound itself or an acidic or basic compound dissolved in a solvent, such as water or alcohol (Such a compound is hereinafter referred to as an acidic catalyst or a basic catalyst respectively). The catalyst concentration has no particular limitations, but the high catalyst concentration tends to increase the hydrolysis speed and the polycondensation speed. However, since the basic catalyst used in a high concentration causes precipitation in the sol solution, it is desirable that the basic catalyst concentration be not higher than 1 normal (1N), as a concentration in the aqueous solution.

The acidic catalyst or the basic catalyst used has no particular restriction as to the species. In cases where the use of a catalyst in a high concentration is required, however, the catalyst constituted of elements which leave no residue in catalyst (crystal) grains upon sintering is represented. Suitable examples of an acidic catalyst include hydrogen halides (e.g., hydrogen chloride), nitric acid, sulfuric acid, sulfurous acid, hydrogen sulfide, perchloric acid, hydrogen peroxide, carbonic acid, carboxylic acids (e.g., formic acid or acetic acid), substituted carboxylic acids (e.g., acidic represented by formula, RCOOH wherein is an element or substituent other than —H and $CH_3$—), and sulfonic acids (e.g., benzenesulfonic acid). Suitable examples of a basic catalyst include ammoniacal bases (e.g., aqueous ammonia) and amines (e.g., ethylamine, aniline).

The thus prepared coating solution is coated on a water-proof support using any of conventional well-known coating methods, and dried to form an image-receiving layer.

The thickness of the image-receiving layer thus formed is preferably from 0.2 to 10 μm, more preferably from 0.5 to 8 μm. In this thickness range, the layer formed can have a uniform thickness and sufficient film-strength.

Examples of a waterproof support usable in the present invention include an aluminum plate, a zinc plate, a bimetal plate such as a copper-aluminum plate, a copper-stainless steel plate or a chromium-copper plate, and a trimetal plate such as a chromium-copper-aluminum plate, chromium-lead-iron plate or a chromium-copper-stainless steel plate, which each has a thickness of preferably from 0.1 to 3 mm, particularly preferably 0.1 to 1 mm. Also, 80–200 μm thick waterproof paper, plastic film and metal foil-laminated paper or plastic film can be used as waterproof support.

It is desirable for the support used in the present invention that the Bekk smoothness on the surface side which is contact with the image-receiving layer be adjusted to preferably at least 300 (sec/10 ml), more preferably from 900 to 3,000 (sec/10 ml), particularly preferably from 1,000 to 3,000 (sec/10 ml). By controlling the Bekk smoothness of the surface side of the support which is contact with the image-receiving layer to at least 300 sec/10 ml, the image reproducibility and the press life can be further improved. As this improved effect can be obtained even when the surface of the image-receiving layer has the same smoothness, the increase in the smoothness of the support surface is supposed to improve the adhesion between the image area and the image-receiving layer.

The expression "highly smooth surface of a waterproof support" as described above means a surface coated directly with the image-receiving layer. In other words, when the support has an under or overcoat layer, the highly smooth surface signifies the surface of the under or overcoat layer.

Thus, the surface condition of the image-receiving layer can be controlled and fully kept without receiving the influence of surface roughness of the support used; as a result, it becomes possible to further improve the image quality.

The adjustment of the surface smoothness to the foregoing range can be made using various well-known methods. For instance, the Bekk smoothness of a support surface can be adjusted by coating a substrate with a resin by using a melt adhesion method, or by using a strengthened calender method utilizing highly smooth heated rollers.

In the case of utilizing an electrophotographic recording system in the present invention, toner images are formed on the image-receiving layer provided on the waterproof support with an electrophotographic process. In general, the transfer of toner images to the material to be transferred in the electrophotographic process is carried out electrostatically. The present printing original plate can be appropriately employed as a lithographic printing original plate for the image formation due to electrostatic transfer, and the thus obtained lithographic printing plate can provide a large number of clear printed matters.

In the above case, it is desirable that the (volume) specific electric resistance of the waterproof support in the part just under the image-receiving layer be preferably less than $10^{14}$ Ω·cm, more preferably from $10^4$ to $10^{13}$ Ω·cm, most preferably from $10^6$ to $10^{12}$ Ω·cm.

By adjusting the specific electric resistance to the above range, blur and distorsion in the transferred image area and toner stain in the non-image area can be prevented to a practically negligible extent, so that images of good quality can be formed. Further, the specific electric resistance of the waterproof support as a whole is preferably less than $10^{14}$ Ω·cm, more preferably from $10^4$ to $10^{13}$ Ω·cm, and most preferably from $10^6$ to $10^{12}$ Ω·cm.

Also, the present lithographic printing original plate can be suitably used as a printing original plate for forming images on the image-receiving layer provided on a waterproof support with an ink jet recording method wherein oil-based ink is jetted out utilizing electrostatic field. The lithographic printing plate prepared using the foregoing method can ensure the printing of a great number of clear printed matters.

It is desirable for the foregoing waterproof support in the ink jet recording system to have electric conductivity and further, at least in the part just under the image-receiving layer, to have a (volume) specific electric resistance of preferably less than $10^{11}$ Ω·cm, more preferably $10^{10}$ Ω·cm or below, particularly preferably $10^8$ Ω·cm or below.

For the waterproof support as a whole, the suitable specific electric resistance thereof is also preferably less than $10^{11}$ Ω·cm, more preferably $10^{10}$ Ω·cm or below, and most preferably $10^8$ Ω·cm or below. Further, that value may be infinitely close to zero.

Additionally, the specific electric resistance (also referred to as volume specific electric resistance or specific resistance) is measured by a guard electrode-attached three-terminal method based on JIS K-6911.

As far as the specific electric resistance is in the foregoing range, the charged ink drops just after adhering to the image-receiving layer can quickly lose their electric charge via the grounding surface. Thus, clear images free from distortion can be formed.

Then, electrically conductive waterproof supports usable in the present invention are illustrated below.

The electric conductivity adjustment of the support can be effected by adopting a method of imparting the electric conductivity on the support all over or a method of providing an electrically conductive layer on one side or both sides of a substrate. The terms "electric conductivity" and "electrically conductive" are hereinafter abbreviated as "conductivity" and "conductive" respectively.

The conductivity as mentioned above can be conferred on the support in the part just under the image-receiving layer, e.g., by covering a substrate, such as paper or film, with a layer comprising an electrically conductive filler, such as carbon black, and a binder, by attaching a metal foil to a substrate, or by evaporating a metallic film onto a substrate.

On the other hand, examples of a support that is conductive as the whole include conductive paper impregnated with sodium chloride, a plastic film in which a conductive filler, such as carbon black, is mixed, and metallic plates such as an aluminum plate.

More detailed descriptions of conductive waterproof supports usable in the present invention are given below.

First, supports that are conductive as the whole are explained.

Such supports can be prepared by using as a substrate a conductive base paper, such as the paper impregnated with sodium chloride, and providing a conductive waterproof layer on both sides of the substrate.

Examples of paper which can be used for preparing the foregoing conductive base paper include wood pulp paper, synthetic pulp paper, and paper made from a mixture of wood pulp and synthetic pulp. It is desirable for such paper to have a thickness of 80 to 200 μm.

In the case of providing a conductive layer on the base papar, the conductive layer comprises a conducting agent and a binder.

Now, the constituent layers and their respective ingredients suitable for an electrophotographic recording system are illustrated below.

The electrically conductive agents which can be used include both inorganic and organic ones. These agents may be used alone or as a mixture of two or more thereof. Examples of the inorganic conductive agent include the salts of monovalent metals, such as Na, K and Li, the salts or the oxides of polyvalent metals, such as Mg, Ca, Ba, Zn, Ti, Co, Ni, Zr, Al and Si, and ammonium salts. The organic conductive agents may be any of low molecular compounds and high molecular compounds which have conventionally been used as conductivity imparting agent, antistatic agent or surfactant. Examples of such a compound include metal soaps (such as metal salts of organic carboxylic acids, sulfonic acid or phosphonic acid), quaternary salt compounds (such as quaternary ammonium salts and quaternary phosphonium salts), anionic surfactants, nonionic surfactants, cationic surfactants, alcoholic compounds (such as acetylene-1,2-diol, xylylene diol, bisphenol A). These compounds may be used alone or as a mixture of two or more thereof.

The proportion of those conductive agent added to a conductive layer is preferably from 3 to 50 weight %, more preferably 5 to 30 weight %, based on the binder used in the same layer.

The binder used together with the foregoing conductive agents can be properly selected from various kinds of resins. Examples of a resin suitable for the binder include hydrophobic resins, such as an acrylic resin, a vinyl chloride resin, a styrene resin, a styrene-butadiene resin, a styrene-acrylic resin, an urethane resin, a vinylidene chloride resin and a vinyl acetate resin, and hydrophilic resins, such as a polyvinyl alcohol resin, cellulose derivatives, starch and derivatives thereof, a polyacrylamide resin, a copolymer of vinyl ether and maleic anhydride, and a copolymer of styrene and maleic anhydride.

The appropriate coverage rate of such a conductive layer is preferably from 1 to 30 $g/m^2$, particularly preferably from 3 to 20 $g/m^2$.

By providing the conductive layer as mentioned above, the waterproof support having an electrically conductive property can be obtained.

For preventing the present printing original plate from curling, the support as mentioned hereinbefore may have a backcoat layer (backing layer) on the side opposite to the image-receiving layer as mentioned hereinbefore. It is desirable for the backcoat layer to have a smoothness of 150 to 700 (sec/10 ml).

By providing such a backcoat layer on the support, the printing plate obtained can be mounted exactly in an offset printing machine without suffering a shear and a slippage.

The more preferable thickness of a waterproof support coated with an under layer or a backcoat layer is from 90 to 130 $\mu$m, more preferably from 100 to 120 $\mu$m.

Thus, scum-free clear images can be formed in the plate-making utilizing a PPC copying machine of electrostatic transfer type. And these toner images can have sufficient fixability, so that they don't come off even when printing pressure and adhesion of ink are imposed thereon during the offset printing operation.

On the lithographic printing original plate obtained in the foregoing manner, images are formed using an electrophotographic recording method to prepare a printing plate.

The electrophotographic recording method employed herein may be any of various well-known recording systems. For instance, the recording systems described, e.g., in *The Fundamentals and Applications of Electrophotographic Techniques,* compiled by Electrophotographic Society, published by Corona Co. in 1988; Kenichi Eda, *Journal of Electrophotographic Society,* 27, 113 (1988); and Akio Kawamoto, ibid., 33, 149 (1994) and 32, 196 (1993); and a PPC copying machine described above can be employed.

The combination of an exposure system in which the exposure is performed by scanning the laser beams based on digital information with a development system using a liquid developer can be adopted herein as an effective process for image information, because it enables the formation of highly precise images. A process example utilizing such a combination is illustrated below.

The registering of a photosensitive material placed on a flat bed is first carried out with register pins, and then the photographic material is fixed to the bed by undergoing air suction on the back side. Next, the photosensitive material is charged with any of the charging devices described, e.g., in the above-described reference, *The Fundamentals and Applications of Electrophotographic Techniques,* from p. 212 on. Specifically, a corotron or scorotron is generally used as charging device. At the time of charging, it is also desirable to control the charging condition so that the surface potential of the photosensitive material is always kept within the intended range through the feedback based on the information from a means of detecting the potential of the charged photosensitive material. Thereafter, the scanning exposure using a laser-beam source is performed according to, e.g., the method as described in the reference described above, from p. 254 on.

Then, the toner image formation is carried out with a liquid developer. The photosensitive material charged and exposed on the flat bed is detached from the bed, and subjected to wet development as described in the same reference as described above, from p. 275 on. At this time, the exposure is carried out in a mode corresponding to the toner image development mode. In the case of reversal development, for instance, the negative image, or the image area, is exposed to laser beams, the toner having the same charge polarity as the charged photosensitive material is employed, and the toner is adhered electrically to the exposed area by applying a bias voltage for development. The principle of this process is explained in detail in the reference described above, from p. 157 on.

For removal of excess developer after development, the photosensitive material is squeegeed with a rubber roller, a gap roller or a reverse roller as shown at page 283 of the above-described reference, or subjected to corona squeegee or air squeegee. Before such a squeegee treatment, it is desirable to give the photosensitive material a rinse with only a carrier liquid of the developer.

Further, the toner image layer formed on the photosensitive material in the aforementioned manner is transferred onto the present lithographic printing original plate as a transfer substrate directly or via a transfer intermediate, and fixed to the transfer substrate.

In more detail, the constituent layers and their respective ingredients suitable for an ink jet recording system is described below.

The conductive layers can be formed by coating a composition containing a conductive filler (i.e., an electrically conductive agent) and a binder on both sides of the conductive paper as mentioned above. Desirably, each of the conductive layers coated has a thickness of from 5 to 20 $\mu$m.

Examples of a conductive filler usable therein include granular carbon black or graphite, a metallic powder such as a silver, copper or nickel powder, a tin oxide powder, flaky aluminum or nickel, and fibrous carbon, brass aluminum, steel or stainless steel.

The foregoing binder can be properly selected from various kinds of resins. Examples of a resin suitable for the binder include hydrophobic resins, such as an acrylic resin, a vinyl chloride resin, a styrene resin, a styrene-butadiene resin, a styrene-acrylic resin, an urethane resin, a vinylidene chloride resin and a vinyl acetate resin, and hydrophilic resins, such as polyvinyl alcohol resin, cellulose derivatives, starch and derivatives thereof, polyacrylamide resin and a copolymer of styrene and maleic anhydride.

Another method for forming the conductive layer is to laminate a conductive thin film. As examples of such a conductive thin film, a metallic foil and a conductive plastic film are exemplified. More specifically, an aluminum foil can be used for the metallic foil as a laminated material, and a polyethylene resin film in which carbon black is mixed can be used for the conductive plastic film as a laminated material. Both hard and soft aluminum foils may be used as the laminated material, and the suitable thickness thereof is from 5 to 20 $\mu$m.

For the lamination of a polyethylene resin in which carbon black is mixed, it is desirable to adopt an extrusion lamination method. This method includes the steps of melting the polyethylene resin by heating, forming the molten resin into a film, pressing the film immediately against the base paper and the cooling them, and can be carried out with various well-known apparatuses. The suitable thickness of the thus laminated layer is from 10 to 30 $\mu$m.

In a case where the material employed as a substrate is a conductive plastic film or a metallic plate, the substrate itself that the whole of the support is conductive, can be used if it has a satisfactory waterproof property.

Such a conductive plastic film is, e.g., a polypropylene or polyester film in which a conductive filler, such as carbon fiber or carbon black, is mixed, and such a metallic plate is, e.g., an aluminum plate. The suitable thickness of a substrate is from 80 to 200 $\mu$m. When the substrate has a thickness of less than 80 $\mu$m, it cannot ensure sufficient strength in the printing plate; while, when the thickness of the substrate is more than 200 $\mu$m, the handling property, such as a transferring efficiency in a drawing apparatus, is lowered.

In the next place, the support having a conductive layer provided on one side or both sides of a waterproof substrate is described below.

As a waterproof substrate, a waterproof paper, a plastic film and a metal foil-laminated paper or plastic film, having a thickness of 80 to 200 $\mu$m can be used.

As a method for forming a conductive layer on the substrate, the same methods as mentioned in the foregoing case where the whole of the supports is conductive, can be used. More specifically, the composition containing a conductive filler and a binder is coated on one side of the substrate to form a layer having a thickness of 5 to 20 $\mu$m. Also, the conductive layer is formed by laminating a metallic foil or a conductive plastic film on the substrate.

Another method which may be employed comprises depositing a metal film, such as an aluminum, tin, palladium or gold film, onto a plastic film.

As mentioned above, the waterproof supports having an electrically conductive property can be obtained.

For preventing the present printing original plate from curling, the support as mentioned above can have a backcoat layer (backing layer) on the side opposite to the foregoing image-receiving layer. It is desirable for the backcoat layer to have the smoothness of 150 to 700 (sec/10 ml).

By providing such a backcoat layer on the support, the printing plate obtained can be mounted exactly in an offset printing machine without suffering a shear and a slippage.

On the lithographic printing original plate prepared in the manner as mentioned above, images are formed using an ink jet recording system to prepare a printing plate.

The ink jet recording may be performed using any of well-known ink jet recording systems. Therein, however, the use of oil-based ink is desirable because it ensures quick drying and satisfactory fixation in the ink image and hardly clogs up a nozzle and a filter, and the adoption of an electrostatic jet type ink jet recording system is desirable because it hardly causes image blur.

Now, the platemaking method utilizing oil-based ink and an electrostatic jet type ink jet recording system is illustrated below.

The oil-based ink usable in the present invention is a dispersion of hydrophobic resin particles, which are solid at least at ordinary temperature. (15–30° C.), in a nonaqueous solvent, preferably having an electric resistance of $10^9$ Ω·cm or above and a dielectric constant of 3.5 or below. By using the foregoing nonaqueous solvent as a dispersing medium, the electric resistance of the oil-based ink can be controlled appropriately; as a result, the jet of ink by the action of an electric field can be properly carried out, and thereby the image quality is improved. Further, the use of resin particles as described above can provide an enhanced affinity for the image-receiving layer upon the ink; as a result, images of good quality can be formed and press life can be improved.

Suitable examples of a nonaqueous solvent having an electric resistance of $10^9$ Ω·cm or above and a dielectric constant of 3.5 or below include linear or branched aliphatic hydrocarbons, alicyclic hydrocarbons, aromatic hydrocarbons and the halogenated products of those hydrocarbons such as octane, isooctane, decane, isodecane, decaline, nonane, dodecane, isododecane, cyanohexane, cyclooctane, cyclodecane, benzene, toluene, xylene, mesitylene, Isopar E, Isopar G, Isopar H and Isopar L (Isopar: trade name, products of Exxon Corp.), Shellsol 70 and Shellsol 71 (Shellsol: trade name, products of Shell Oil Corp.), and Amsco OMS and Amsco 460 solvent (Amusco: trade name, products of American Mineral Spirits Corp.). They can be used alone or as a mixture of two or more thereof. As the nonaqueous solvents, the upper limit of their electric resistance values is of the order of $10^{16}$ Ω·cm, and the lower limit of their dielectric constant values is about 1.8.

When the electric resistance of the nonaqueous solvent used is below the foregoing range, the resulting ink cannot have an appropriate electric resistance, so that the jet of ink by the action of an electric field becomes poor; while, when the dielectric constant of the nonaqueous solvent used is above the foregoing range, the electric field is apt to be relaxed in the ink, and thereby a poor jet of the ink tends to be caused.

The resin particles dispersed in the nonaqueous solvent as mentioned above are hydrophobic resin particles which are solid at temperatures of 35° C. or below and have good affinity with the nonaqueous solvent. As such a hydrophobic resin, a resin (P) having a glass transition temperature of −5° C. to 110° C. or a softening temperature of 33° C. to 140° C. is preferred. The more preferable range of the glass transition temperature is from 10° C. to 100° C. and that of the softening temperature is from 38° C. to 120° C. In particular, it is favorable for the resin (P) to have a glass transition temperature of 15° C. to 80° C. or a softening temperature of 38° C. to 100° C.

By using a resin having such a glass transition or softening temperature as mentioned above, the affinity of each resin particle with the surface of the image-receiving layer is enhanced and the resin particles are firmly bonded to one another on the printing original plate. Thus, the adhesiveness of the ink image to the image-receiving layer is improved and the press life is improved. On the other hand, if the glass transition or softening temperature of the resin used is beyond the upper and lower limits specified above, the affinity of each resin particle with the image-receiving layer surface is lowered and the bond between resin particles is weakened.

The suitable weight average molecular weight Mw of the resin (P) is from $1\times10^3$ to $1\times10^6$, preferably from $5\times10^3$ to $8\times10^5$, and more preferably from $1\times10^4$ to $5\times10^5$.

Examples of such a resin (P) include olefin homopolymers and copolymers (such as polyethylene, polypropylene, polyisobutylene, ethylene-vinyl acetate copolymer, ethylene-acrylate copolymer, ethylene-methacrylate copolymer and ethylene-methacrylic acid copolymer), vinyl chloride copolymers (such as polyvinyl chloride polymer and vinyl chloride-vinyl acetate copolymer), vinylidene chloride copolymers, vinyl alkanoate homopolymers and copolymers, allyl alkanoate homopolymers and copolymers, homopolymers and copolymers of styrene and derivatives thereof (such as butadiene-styrene copolymer, isoprene-styrene copolymer, styrene-methacrylate copolymer and styrene-acrylate copolymer), acrylonitrile copolymers, methacrylonitrile copolymers, alkyl vinyl ether copolymers, acrylate homopolymers and copolymers, methacrylate homopolymers and copolymers, itaconic acid diester homopolymers and copolymers, maleic anhydride copolymers, acrylamide copolymers, methacrylamide copolymers, phenol resins, alkyd resins, polycarbonate resins, ketone resins, polyester resins, silicone resins, amide resins, hydroxyl and carboxyl-modified polyester resins, butyral resins, polyvinyl acetal resins, urethane resins, rosin resins, hydrogenated rosin resins, petroleum resins, hydrogenated petroleum resins, maleic acid resins, terpene resins, hydrogenated terpene resins, chroman-indene resins, cyclized rubber-methacrylate copolymers, cyclized rubber-acrylate copolymers, copolymers containing a heterocyclic ring containing no nitrogen atom (e.g., furan rings, tetrahydrofuran rings, thiophene rings, dioxane rings, dioxofuran rings, lactone rings, benzofuran rings, benzothiophene rings or/and 1,3-dioxetane rings), and epoxy resins.

It is desirable for the resin particles to be contained in the present oil-based ink in a proportion of from 0.5 to 20 weight % based on the total ink. When the proportion of the resin particles is lower than 0.5 weight %, it becomes hard for the ink to have an affinity with the image-receiving layer of the present printing original plate; as a result, the ink cannot form images of good quality and the press life of the printing plate obtained is lowered. When the proportion is increased beyond the foregoing range, on the other hand, the homogeneous dispersion is performed with difficulty; as a result, the ink is apt to clog up the head of a jet nozzle and to be jetted out with difficulty.

For the oil-based ink used in the present invention, it is desirable to contain a coloring material so that the coloring material makes the ink image area opaque in cooperation with the resin particles dispersed in the ink upon irradiation with UV light for making the non-image area receptive to water.

Such a coloring material may be any of pigments and dyes which have been conventionally used in oil-based ink compositions and liquid developer for electrostatic photography.

Those pigments have no particular restriction, but include both inorganic and organic pigments which are generally used in the printing field. Examples of a pigment usable in the present oil-based ink include carbon black, cadmium red, molybdenum red, chrome yellow, cadmium yellow, Titan Yellow, chromium oxide, viridian, titan cobalt green, ultramarine blue, Prussian blue, cobalt blue, azo pigments, phthalocyanine pigments, quinacridone pigments, isoindolinone pigments, dioxazine pigments, indathrene pigments, perylene pigments, perynone pigments, thioindigo pigments, quinophthalone pigments and metal complex pigments.

As the dyes, oil-soluble.dyes are suitable for the present oil-based ink, with examples including azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallo-phthalocyanine dyes.

These pigments and dyes may be used alone, or they can be used in proper combinations. It is desirable that they are contained in a proportion of from 0.01 to 5 weight % based on the total ink.

Such a coloring material as described above may be dispersed into a nonaqueous solvent as a dispersed particle separately from the resin particles, or it may be incorporated into the resin particles dispersed in a nonaqueous solvent. In the latter case, the incorporation of a pigment is generally effected by coating the pigment with the resin material of resin particles to form resin-coated particles, while the incorporation of a dye is generally effected by coloring the surface part of resin particles with the dye to form colored particles.

The suitable average diameter of the resin particles, including colored particles, dispersed in the present nonaqueous solvent is preferably from 0.10 to 1 μm, more preferably from 0.15 to 0.8 μm. The diameters of those particles are determined with a particle size analyzer, CAPA-500 (trade name, made by Horiba Seisakusho K.K.).

The nonaqueous dispersion of resin particles used in the present invention can be prepared using a well-known mechanical grinding method or polymerization granulation method. In a mechanical grinding method, the materials for forming resin particles are mixed, molten and kneaded, if needed, and directly ground into fine particles with a conventional grinder, and further dispersed in the presence of a dispersing polymer by means of a conventional wet-type dispersing machine (e.g., a ball mill, a paint shaker, a Kady mill, a dyno mill). In another mechanical grinding method, the material as a component of resin particles and a dispersion assisting polymer (a covering polymer) are kneaded in advance to form a kneaded matter, then ground into fine particles, and further dispersed in the presence of a dispersion polymer. Therein, the methods of preparing coating (i.e., paints) or liquid developers for electrostatic photography can be adopted in practice. Details of these methods are described in e.g., *Flow of Paints and Dispersion of Pigments,* translated under the supervision of Kenji Ueki, published by Kyoritsu Shuppan in 1971; *Solomon, Paint Science; Paint and Surface coating and Theory and Practice;* Yuji Harasaki, *Coating Engineering,* Asakura Shoten (1971); and Yuji Harasaki, *Elementary Course of Coating Science,* Maki Shoten (1977).

As a polymerization granulation method, well-known methods for dispersion polymerization in nonaqueous media can be employed. Details of such methods are described in e.g., *The Newest Technology of Super-fine Polymer Particles,* chapter 2, compiled under the supervision of Soichi Muroi, published by CMC Shuppan in 1991; *The Latest Systems for Electrophotographic Development, and Development and Application of Toner Materials,* chapter 3, compiled by Koichi Nakamura, published by Nippon Kagaku Joho K.K. in 1985; and K. B. J. Barrett, *Dispersion Polymerization in Organic Medium,* John Wiley (1976).

In order to stabilize the particles dispersed in a nonaqueous medium, the particles are generally dispersed together with a dispersing polymer (PS). The dispersing polymer (PS) contains constitutional repeating units soluble in a nonaqueous medium as a main component, and the suitable molecular weight thereof is preferably from $1\times10^3$ to $1\times10^6$, more preferably from $5\times10^3$ to $5\times10^5$, as weight average molecular weight Mw.

Suitable examples of soluble repeating units of a dispersing polymer (PS) usable in the present invention include polymerizing components represented by formula (III):

(III)

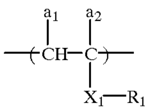

wherein $X_1$ represents —COO—, —OCO— or —O—; $R_1$ alkyl or alkenyl group having 10 to 32 carbon atoms, preferably an alkyl or alkenyl group having 10 to 22 carbon atoms, which may have a linear or branched structure and may be substituted (although the unsubstituted form is preferred) with substituents including decyl, dodecyl, tridecyl, tetradecyl, hexadecyl, octadecyl, eicosanyl, docosanyl, decenyl, dodecenyl, tridecenyl, hexadecenyl, octadecenyl and linoleyl groups; and $a^1$ and $a^2$, which may be the same or different, each preferably represent a hydrogen atom, a halogen atom (e.g., chlorine, bromine), a cyano group, an alkyl group having 1 to 3 carbon atoms (e.g., methyl, ethyl, propyl), —COO—$Z^1$ or —$CH_2$COO—$Z^1$ [wherein $Z^1$ represents a hydrocarbon group having not more than 22 carbon atoms which may be substituted (such as an alkyl, alkenyl, aralkyl, alicyclic or aryl group), with examples including unsubstituted or substituted alkyl groups having 1 to 22 carbon atoms (e.g; methyl, ethyl, propyl, butyl, heptyl, hexyl, octyl, nonyl, decyl, dodecyl, tridecyl, tetradecyl, hexadecyl, octadecyl, eicosanyl, docosanyl, 2-chloroethyl, 2-bromoethyl, 2-methoxycarbonylethyl, 2-methoxyethy), unsubstituted or substituted alkenyl groups having 4 to 18 carbon atoms (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, linoleyl), unsubstituted or substituted aralkyl groups having 7 to 12 carbon atoms (e.g., benzyl, phenetyl, 3-phenylpropyl, naphthylmethyl, 2-naphthylethyl, chlorobenzyl, bromobenzyl, methylbenzyl, ethylbenzyl, methoxybenzyl, dimethylbenzyl, dimethoxybenzyl), unsubstituted or substituted alicyclic groups having 5 to 8 carbon atoms (e.g., cyclohexyl, 2-cyclohexylethyl, 2-cyclopentylethyl) and unsubstituted or substituted aromatic groups having 6 to 12 carbon atoms (e.g., phenyl, naphthyl, tolyl, propylphenyl, butylphenyl, octylphenyl, methoxyphenyl, chlorophenyl, bromophenyl, acetylphenyl, methoxycarbonylphenyl, ethoxycarbonylphenyl, propionamidophenyl)].

In addition to the constitutional repeating units of formula (III), the dispersing polymer (PS) may contain other repeating units as copolymerizing components. The copolymerizing components may be derived from any monomers as far as they can be copolymerized with the monomers corresponding to the repeating units of formula (III).

The suitable proportion of the constitutional repeating units of formula (III) in the dispersing polymer (PS) is preferably at least 50 weight %, more preferably at least 60 weight %.

Examples of such a dispersing polymer (PS) include the polymers described, e.g., in Japanese Patent Application Nos. 9-16967, 9-19696, 9-21014, 9-21011 and 9-21017, and JP-B-6-40229 (the term "JP-B" as used herein means an "examined Japanese patent publication"), but these examples should not be construed as limiting on the scope of this invention.

In preparing the foregoing resin (P) particles in a state of emulsion (latex), it is desirable that the dispersing polymer (PS) be added prior to the polymerization.

In the case of using a dispersing polymer (PS), the proportion of the dispersing polymer in the total ink is from about 0.05 to about 4 weight %.

In the oil-based ink employed in the present invention, it is desirable that the dispersed resin particles and colored particles (the particles of a coloring material) be positively or negatively charged voltage-detective particles.

The voltage-detective properties can be imparted on those particles by utilizing the technique of wet developers for electrostatic photography. For instance, such properties can be imparted to the particles by using the voltage-detective materials and other additives described in *The Latest Systems for Electrophotographic Development System, and Development and Application of Toner Materials,* pp. 139–148; *The Fundamentals and Applications of Electrophotographic Techniques,* compiled by Electrophotographic Society, pp. 497–505 (published by Corona Co. in 1988); and Yuji Harasaki, *Electrophotography,* vol. 16 (No.2), p. 44 (1977).

In addition, details of those materials are described in, e.g., GB Patents 893,429 and934,038, U.S. Pat. Nos. 1,122,397, 3,900,412 and 4,606,989, JP-A-60-179751, JP-A-60-185963 and JP-A-2-13965.

It is desirable that the charge modifiers as described above be used in a proportion of 0.001 to 1.0 parts by weight per 1,000 parts by weight of dispersing medium as a carrier liquid. Furthermore, various kinds of additives can be added, but the total amount of additives has an upper limit because it is restricted by the electric resistance allowable for the oil-based ink used in the present invention. More specifically, when the ink has an electric resistance of lower than $10^9$ Ω·cm in a condition that the dispersed particles are removed from the ink, the formation of a continuous gradation image having good quality becomes difficult. Therefore, it is required that the addition amount of each additive be controlled within the foregoing limitation.

Then, processes for forming images on the present lithographic printing plate precursor (i.e., the present lithographic printing original plate) as mentioned above [also referred to as "master" hereinafter] are illustrated below.

For instance, such processes can be performed utilizing the apparatus as shown in FIG. 1.

The apparatus shown in FIG. 1 comprises an ink jet recording (system) apparatus 1 wherein an oil-based ink is used.

First, as shown in FIG. 1, the pattern information of images (figures and sentences) to be formed on a master 2 is supplied from an information-supply source, such as a computer 3, to an oil-based ink-using ink jet recording (system) apparatus 1 via a transmission means, such as a bus 4. The recording (system) apparatus 1 stores oil-based ink inside an ink jet recording head 10. When the master 2 is passed through the recording (system) apparatus 1, the head 10 jets out fine drops of the ink onto the master 2 in accordance with the foregoing information, and thereby the ink is attached to the master 2 in the foregoing pattern. Thus, the image formation on the master 2 is completed, and then a plate-making master (i.e., a lithographic printing original plate) is obtained.

Figure 2:
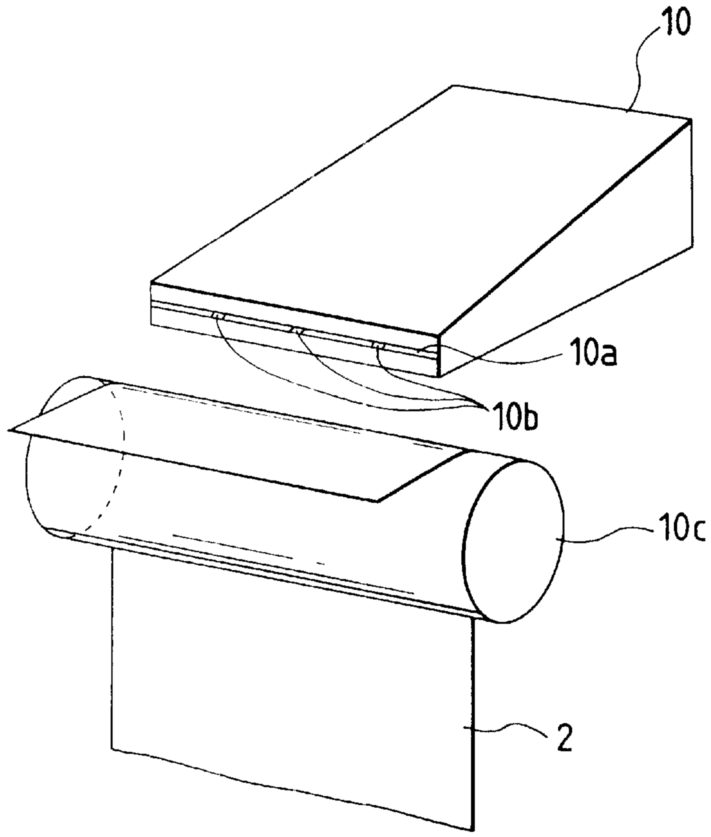
FIG. 2 is a schematic constitution view showing the essential parts in an apparatus with an ink jet recording system used in the present invention.
Figure 3:
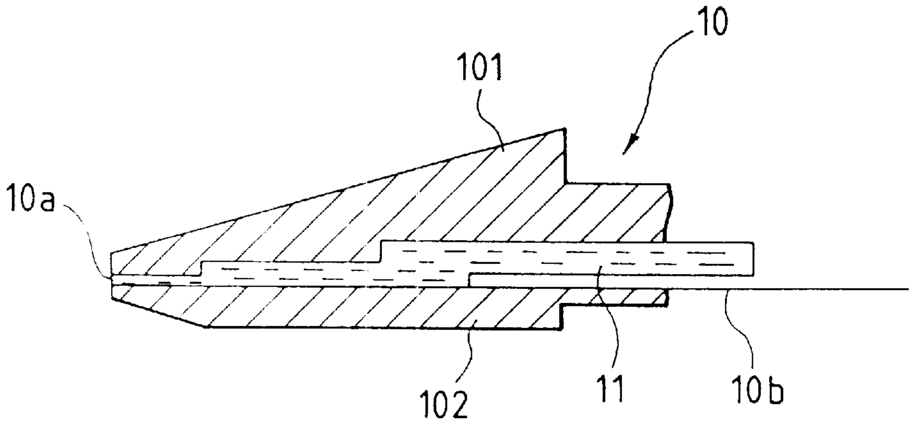
FIG. 3 is a partially cross sectional view of the head in an apparatus with-an ink jet recording system used in the present invention.

An example of a structure of the ink jet recording (system) apparatus-used in the apparatus shown in FIG. 1 is shown in FIG. 2 and FIG. 3. The members common to FIG. 2 and FIG. 3 are denoted by common marks, respectively.

FIG. 2 is a schematic constitution view showing the essential parts of the ink jet recording (system) apparatus, and FIG. 3 is a partially cross sectional view of the head.

As shown in FIG. 2 and FIG. 3, the head 10 equipped to the ink jet recording (system) apparatus has a slit lying between an upper unit 101 and a lower unit 102, and the tip of the slit is a jet slit 10*a*. Further, a jet electrode 10*b* is disposed inside the slit, and the interior of the slit is filled up with oil-based ink 11.

To the jet electrode 10*b* of the head 10, the voltage is applied in accordance with the digital signals from the pattern information of images. As shown in FIG. 2, the counter electrode 10*c* is arranged so as to face with the jet electrode 10*b,* and the master 2 is provided on the counter electrode 10*c*. By the application of the voltage, the circuit is formed between the jet electrode 10*b* and the counter electrode 10*c*. As a result, the oil-based ink 11 is jetted out from the jet slit 10*a* of the head 10, and forms images on the master 2 provided on the counter electrode 10*c*.

With respect to the width of the jet electrode 10*b,* it is desirable for the tip thereof to be as narrow as possible in order to form high quality images, e.g., prints of high resolution.

For instance, 40 μm-dot print can be formed on the master 2 by filling up the head 10 as shown in FIG. 3 with the oil-based ink, disposing the jet electrode 10*b* having a tip width of 20 μm and the counter electrode 10*c* so as to face with each other at a distance of 1.5 mm and applying a voltage of 3 KV for 0.1 millisecond between these two electrodes.

The master having the ink image is irradiated all over with ultraviolet light, thereby selectively changing the surface condition of only the non-image area to be receptive to water.

The image area, on the other hand, retains ink-receptive properties because the colored ink images are impermeable to ultraviolet light.

The light source of ultraviolet light used for the foregoing irradiation may be any of lamps emitting light having a wavelength of 300 to 450 nm. In particular, lamps which enable efficient use of wavelengths of from 350 nm to 420 nm are preferred.

Examples of such a lamp include a mercury lamp, a metal halide lamp and a xenon lamp. The irradiating condition can be arbitrarily selected as far as the surface of the irradiated area can have a contact angle with water of preferably 15 degree or below. For instance, the preferable irradiation time is up to about 5 minutes.

Thus, the printing plate which can provide clear printed matters having no scumming by offset printing can be prepared.

Additionally, the method for forming images on the present lithographic printing original plate is not limited to an ink jet recording system, but other well-known systems, such as an electrophotographic recording system and a heat-sensitive recording system, can be applied thereto.

EXAMPLE

The present invention will now be illustrated in more detail by reference to the following examples, but these examples are not to be construed as limiting the scope of the invention in any way.

Example I-1

<Preparation of Lithographic Printing Original Plate>

The following composition was stirred for 60 minutes to prepare a coating solution.

| | |
|---|---|
| 30% Aqueous dispersion of photocatalyst titanium oxide sol, STS-01 (produced by Ishihara Sangyo Kaisha Ltd.) | 167 g |
| Colloidal silica, Snowtex C (20% dispersion) (produced by Nissan Chemical Industries Ltd.) | 50 g |
| Methyltrimethoxysilane | 50 g |
| Ethanol | 285 g |

The support of a Model ELP-1X master (trade name, a product of Fuji Photo Film Co., Ltd.) having Bekk smoothness of 1,000 (sec/10 ml) on the under layer side, which is available as an electrophotographic type lithographic printing original plate for small-scale printing, was employed herein. On this support, the coating solution prepared above was coated by means of a wire bar so as to have a dry coverage of 1 $g/m^2$, set to touch and further heated at 120° C. for 30 minutes to form an image-receiving layer. Thus, a lithographic original plate sample was prepared.

The smoothness of this printing original plate was 800 (sec/10 ml), measured using a Bekk smoothness tester (made by Kumagai Riko K.K.) under a condition that the air volume was 10 ml.

In addition, 2 μl of distilled water was put on the surface of this printing original plate, and after a 30-second lapse the contact angle of the water with the printing original plate surface was measured with a surface contact meter (CA-D, trade name, a product of Kyowa Kaimen Kagaku K.K.). The measured value was 55 degrees.

An electrophotographic photoreceptor prepared in the manner described below was subjected to corona discharge in the dark to gain the surface potential of +450 V, and then to scanning-exposure using a 788 mm semiconductor laser beam-utilized drawing device as an exposure apparatus. Therein, the laser beam scanning was performed on the basis of image information which was obtained by previously reading an original with a color scanner, subjecting the read image information to color separation, making some corrections relating to color reproduction characteristic of the system used, and then memorizing the corrected image information as digital image data in the internal hard disk of the system. As the laser beam scanning condition adopted, the beam spot diameter was 15 μm, the pitch was 10 μm and the scanning speed was 300 cm/sec (or 2,500 dpi). The amount of exposure on the photoreceptor was adjusted to 25 $erg/cm^2$.

<Electrophotographic Photoreceptor>

The mixture of 2 g of X-type metal-free phthalocyanine (produced by Dai-Nippon Ink & Chemicals Inc.), 14.4 g of the following Binder resin (P-1), 3.6 g of the following Binder resin (P-2), 0.15 g of the following Compound (A) and 80 g of cyclohexanone was placed together with glass beads in a 500 ml of glass vessel, and dispersed for 60 minutes with a paint shaker (made by Toyo Seiki Seisakusho). Then, the glass beads was filtered out, and a dispersion for photoreceptive layer was prepared.

Binder resin (P-1)

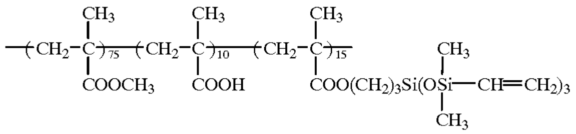

Mw: 6 x $10^4$

Binder resin (P-2)

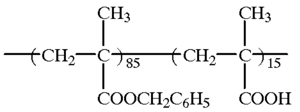

Mw: 8 x $10^3$

Compound (A)

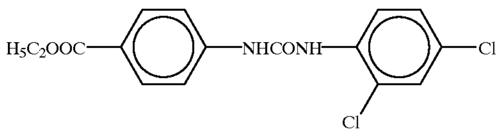

The dispersion thus prepared was coated on a 0.2 mm-thick degreased aluminum plate by means of a wire bar, set to touch, and then heated for 20 seconds in a circulation type oven regulated at 110° C. The thus formed photoreceptive layer had a thickness of 8 $\mu$m.

Subsequently, the photoreceptor exposed in the foregoing manner was developed with the following liquid developer, rinsed in a bath of Isopar G alone to remove stains in the non-image area, and dried with a hot air so that the photoreceptor had a surface temperature of 50° C. and the amount of residual Isopar G was reduced to 10 mg per mg of the toner. Further, the thus processed photoreceptor was subjected to −6 KV precharge with a corona charging device, and the resulting photoreceptor was brought into face-to-face contact with the foregoing lithographic printing original plate and underwent negative corona discharge on the photoreceptor side, thereby performing the image transfer.

<Liquid Developer>

The following ingredients were mixed and kneaded for 2 hours at 95° C. by means of a kneader to prepare a mixture. This mixture was cooled inside the kneader, and ground to a powder therein. The powder in an amount of 1 pts. wt. and Isopar H in an amount of 4 pts. wt. were dispersed for 6 hours with a paint shaker to prepare a dispersion. This obtained dispersion was diluted with Isopar G so as to have a solid toner content of 1 g per liter and, at the same time, basic barium petronate was added thereto in an amount of 0.1 g per 1 liter. Thus, a liquid developer was prepared.

| (Ingredients to be kneaded) | |
|---|---|
| Ethylene-methacrylic acid copolymer, Nucrel N-699 (produced by Mitsui Du Pont Co.) | 3 pts. wt. |
| Carbon Black #30 (produced by Mitsubishi Chemical Industries Ltd.) | 1 pts. wt. |
| Isopar L (produced by Exxon Corp.) | 12 pts. wt. |

The thus image-formed lithographic printing original plate (plate-making master) was heated at 100° C. for 30 seconds, thereby completing the toner image fixation.

The thus fixed images of the plate-making master were observed under an optical microscope of 200 magnifications, and thereby the image quality was evaluated. As a result, the images obtained were found to be clear and had neither blur nor loss even in the area of thin lines and that of fine characters.

Then, the plate-made master was exposed for 3 minutes by means of a 100 W high-pressure mercury lamp placed in a distance of 5 cm.

The surface wettabilities of the non-image area and the image area (solid image area) of the thus obtained lithographic printing plate were evaluated by the contact angle with water. The contact angle of water with the surface of the non-image area was changed to 0 degree, and that of the image area was 90 degrees.

Further, the thus prepared lithographic printing plate was mounted in a printing machine, Oliver Model 94 (made by Sakurai Seisakusho K.K.), and the printing was performed on sheets of printing paper via the lithographic printing plate by means of Indian ink for offset printing and a fountain solution prepared by diluting SLM-OD (produced by Mitsubishi Paper Mills, Ltd.) with distilled water by a factor of 100 and placed in a dampening saucer.

The 10th printed matter was picked in the course of printing, and the printed images thereon were evaluated by visual observation via a magnifier of 20 magnifications. The observation result indicated that the non-image area was free from scumming ascribed to the printing ink adhesion and the uniformity of the solid image area was highly satisfactory. Further, this printed matter was observed under the optical microscope of 200 magnifications. According to this observation, neither blur nor loss were found in the areas of thin lines and fine characters, and the image quality of printed matter was excellent.

In the aforementioned printing operations, more than 2,000 sheets of printed matter having image quality equal to that of the 10th print were obtained.

Example I-2

Preparation of Specimen Nos. I-1 to I-7

[Preparation of Waterproof Support]

Wood free paper having a weight of 100 g/$m^2$ was used as a substrate, and the following coating composition for a backcoat layer was coated on one side of the substrate by means of a wire bar to form a backcoat layer having a dry coverage of 12 g/$m^2$. Further, the backcoat layer was subjected to a calender treatment so as to have a smoothness of about 50 (sec/10 ml).

| (Coating Composition for Backcoat Layer) | |
|---|---|
| Kaolin (50% aqueous dispersion) | 200 parts |
| Polyvinyl alcohol (10% aqueous solution) | 60 parts |
| SBR latex (solids content: 50%, Tg: 0° C.) | 190 parts |
| Melamine resin (solids content: 80%, Sumirez Resin SR-613) | 5 parts |

On the other side of the substrate, the coating composition for an under layer, which had one of the formulae I-A to I-G shown in Table I-1, was coated with a wire bar to form an under layer having a dry coverage of 10 g/$m^2$. Further, the under layer was subjected to a calender treatment so as to have a smoothness of about 1,500 (sec/10 ml). The thus prepared seven samples of waterproof support were referred to as support samples No. 01 to No. 07 corresponding to the composition formulae I-A to I-G respectively, as shown in Table I-1.

TABLE I-1

| | Composition | | | | |
|---|---|---|---|---|---|
| Formula | Carbon black | Clay | SBR latex | Melamine resin | Support sample No. |
| I-A | 0 | 5 | 36 | 4 | 01 |
| I-B | 0 | 60 | 36 | 4 | 02 |
| I-C | 3 | 57 | 36 | 4 | 03 |
| I-D | 5.4 | 54.6 | 36 | 4 | 04 |
| I-E | 7.2 | 52.8 | 36 | 4 | 05 |
| I-F | 12 | 51 | 36 | 4 | 06 |
| I-G | 18 | 45 | 36 | 4 | 07 |

The figures in the above table are the solid contents of ingredients, expressed in weight %, in each composition.

<Ingredients of Coating Composition for Under Layer>

Carbon black (30% aqueous dispersion)

Clay (50% aqueous dispersion)

SBR latex (solids content: 50%, Tg: 25° C.)

Melamine resin (solids content: 80%, Sumirez Resin SR-613)

Each set of ingredients were mixed in accordance with its corresponding formula shown in Table I-1, and further admixed with water so as to have a total solid concentration of 25%. Thus, the coating compositions I-A to I-G for the under layer formation were obtained.

The measurement of specific electric resistance of each under layer was carried out in the following manner.

Each of the coating compositions I-A to I-G was applied to a thoroughly degreased and cleaned stainless steel plate at a dry coverage of 10 $g/m^2$ to form a coating film. The thus formed seven samples of coating film were each examined for specific electric resistance in accordance with the guard electrode-attached three-terminal method based on JIS K-6911. The measurement results are shown in Table I-2.

TABLE I-2

| Under Layer | Specific Electric Resistance ($\Omega \cdot cm$) |
|---|---|
| I-A | $1 \times 10^{14}$ |
| I-B | $2 \times 10^{12}$ |
| I-C | $1 \times 10^{11}$ |
| I-D | $4 \times 10^{9}$ |
| I-E | $1 \times 10^{8}$ |
| I-F | $8 \times 10^{3}$ |
| I-G | $4 \times 10^{3}$ |

[Preparation of Lithographic Printing Original Plates]

The dispersion having the following composition was coated on each of the support samples No. 01 to No. 07 at a dry coverage of 2.5 $g/m^2$ to form an image-receiving layer, thereby preparing lithographic printing original plates. Each printing original plate surface had a smoothness of 100 to 115 (sec/10 ml) and the contact angle of water therewith was 55 degrees.

<Coating Composition for Image-receiving Layer>

The following composition, together with glass beads, was placed in a paint shaker (produced by Toyo Seiki K.K.), and dispersed for 30 minutes at the ordinary temperature. Thereafter, the glass beads were filtered out, and a dispersion was obtained.

| | |
|---|---|
| Photocatalyst titanium oxide powder, ST-01 (produced by Ishihara Sangyo Kaisha Ltd.) | 45 g |
| Silica gel, Sylsia #430 (average particle diameter: 2.5 $\mu$m (produced by Fuji Sylsia Kagaku Co., Ltd.) | 10 g |
| Methyltriacetoxysilane | 30 g |
| Tetramethoxysilane | 20 g |
| 1N hydrochloric acid | 5 g |
| Water | 560 g |

The lithographic printing original printing plate Specimen Nos. I-1 to I-7 prepared in the aforementioned manner were each made into a plate-made master with a laser printer using a dry toner, Xante Plate Maker-8200 J.

Subsequently, each plate-made master (i.e., printing original plate) was irradiated with ultraviolet light for 3 minutes with the same light source as used in Example I-1 which was placed in a distance of 20 cm. Thus, lithographic printing plate samples were prepared.

The contact angles of water with the non-image area and the image area of each lithographic printing plate were 5 degrees and 90 degrees respectively.

Further, each of the thus obtained lithographic printing plates was mounted in an automatic printing machine, AM-2850 (trade name, a product of AM Co. Ltd.), and the printing operations were performed using Indian ink for offset printing machine and a fountain solution prepared by diluting SLM-OD with distilled water by a factor of 50 and placed in a dampening saucer.

Each of the thus obtained lithographic printing plates was examined for image quality of printing plate, image quality of printed matter therefrom (print quality) and press life. The following criteria are employed for evaluating those qualities.

1) Image Quality of Printing Plate

The drawn images of each lithographic printing plate were observed under an optical microscope of 200 magnifications, and thereby the image quality was evaluated. The capital letters E, G, M and B in Table I-3 represent the following states respectively.

E . . . The images are very clear, and even thin lines and fine characters have excellent quality.

G . . . The images are clear, and even thin lines and fine characters have good quality.

M . . . There is slight image loss in the areas of thin lines and fine characters.

B . . . There are image loss in the areas of thin lines and fine characters and clear spots in the solid image area, so the image quality is bad.

2) Image Quality of Printed Matter

The quality of images printed from each lithographic printing plate was evaluated in the same manner as in the above item 1). The capital letters E, G, M and B in Table I-3 represent that the printed matters are in the same states as mentioned above respectively.

3) Press Life

The press life is expressed in terms of the number of scum-free or image loss-free printed matters obtained from each lithographic printing plate. The terms scum and image loss used herein signify those detectable by visual observation.

The evaluation results are shown in Table I-3.

TABLE I-3

| Specimen No. | Support sample | Image quality of printing plate | Image quality of printed matter | Press life |
|---|---|---|---|---|
| I-2 | No. 02 | E | E | 1,500 |
| I-3 | No. 03 | E | E | 1,500 |
| I-4 | No. 04 | E | E | 1,500 |
| I-5 | No. 05 | E | E | 1,500 |
| I-1 | No. 01 | M | M | 1,500 |
| I-6 | No. 06 | M - B | B | 300 |
| I-7 | No. 07 | M - B | B | 300 |

As is apparent from the results of Table I-3, the present lithographic printing plates achieved excellent results with respect to image quality of printed matter as well as image quality of printing plate.

Further, the results shown in Table I-3 are considered in some detail by reference to the values of specific electric resistance shown in Table I-2.

In Specimen Nos. I-2 to I-5, the under layer of each support had a specific electric resistance of $10^{12}$ to $10^{8}$ $\Omega\cdot cm$; as a result, the images formed were very clear, even the thin lines and fine characters had excellent quality, and the press life attained was high.

On the other hand, in Specimen No. I-1, each the under layer had specific electric resistance of not less than $10^{14}$ $\Omega\cdot cm$ and in Specimen Nos. I-6 and I-7, each the under layer had specific electric resistance of less than $10^{4}$ $\Omega\cdot cm$; as a result, loss in thin-line and fine-character image areas and clear spots in the solid image area were caused.

In other words, the results obtained indicate that the drawn image quality of printing plate and the image quality of printed matter are better the higher conductivity the under layer provided just under the image-receiving layer have.

Example I-3

A mixture of 133 g of a 30% solution of photocatalyst titanium oxide sol (STS-02, trade name, a product of Ishihara Sangyo Kaisha Ltd.), 25 g of colloidal silica, Snowtex C, 25 g of γ-methacryloxypropyltrimethoxysilane, 160 g of isopropanol and 144 g of water was stirred for 10 minutes. To the dispersion obtained, a mixture of 10 g of tetra(t-butoxy)titanium, 1.5 g of acetyl acetone, 18 g of isopropanol, 7 g of ethylene glycol and 7 g of tetrahydrofuran, and 0.1 g of 4,4'-azobis(4-cyanovaleric acid) were added, and stirred for 30 minutes, thereby preparing a coating composition.

On the same waterproof support as used in Example I-1, the above composition was coated with a wire bar, set to touch and further dried at 100° C. for 60 minutes to form an image-receiving layer having a dry coverage of 2 g/$m^2$. Thus, a lithographic printing original plate was prepared. The Bekk smoothness of this printing original plate on the surface side was 850 (sec/10 ml) and the contact angle of water with that surface was 55 degrees.

In the same manners as in Example I-1, the images were formed on this printing original plate and the resulting printing plate was subjected to fixation and ultraviolet irradiation treatments to be made into a lithographic printing plate, followed by offset printing.

The printed matters obtained from the present lithographic printing plate had clear images and no scum in the non-image area, similarly to those from the lithographic printing plate made in Example I-1, and the number of such good-quality printed matters was more than 2,000, namely the press life of the present printing plate was satisfactorily high.

Examples I-4 to I-10

Lithographic printing original plates were prepared in the same manner as in Example I-1, except that the compounds shown in Table I-4 were each used in an amount of 0.37 mole instead of the methyltrimethoxysilane in the coating solution for the image-receiving layer.

TABLE I-4

| Example | Silyl Compound |
|---|---|
| I-4 | Butyl trimethoxysilane |
| I-5 | 3-Glycidoxypropyltrimethoxysilane |
| I-6 | 3-Hydroxypropyltrimethoxysilane |
| I-7 | Phenyltrimethoxysilane/propyltrimethoxysilane (4/6 by mole) mixture |
| I-8 | Vinyltris(2-methoxyethoxy)silane/ triethoxysilane (3/7 by mole) mixture |
| I-9 | Dimethyldimethoxysilane/methyltripropoxysilane (1/1 by mole) mixture |
| I-10 | 3-Mercaptopropyltri(2-methoxyethoxy)silane/ ethyltrimethoxysilane (4/6 by mole) mixture |

The thus prepared printing original plates each had Bekk smoothness of not lower than 800 (sec/10 ml) on the surface side, and the contact angle of water with that surface was not lower than 50 degrees.

In the same manners as in Example I-1, the images were formed on each printing original plate and the resulting printing plate was subjected to fixation and ultraviolet irradiation treatments to prepare a lithographic printing plate, followed by offset printing.

The printed matters obtained from each of the lithographic printing plates had clear images and no scum in the non-image area, similarly to those from the lithographic printing plate made in Example I-1, and the number of such good-quality printed matters was more than 2,000, namely the press life of the present-printing plate was satisfactorily high.

Example I-11

The following composition was stirred for 20 minutes to prepare a dispersion. This dispersion was coated on a 100 μm-thick aluminum plate having thereon a 2 μm-thick hardened gelatin film at a dry coverage of 2 g/$m^2$ by means of a wire bar, and set to tough.

Further, the thus dried coating was heated at 150° C. for 30 minutes, thereby preparing a lithographic printing original plate.

| | |
|---|---|
| Photocatalyst titanium oxide sol, STS-02 (produced by Ishihara Sangyo Kaisha Ltd.) | 50 g (as solid content) |
| Benzyltrimethoxysilane | 60 g |
| Alumina sol 520 (produeced by Nissan Chemical Industries Ltd.) | 10 g (as solid content) |
| Silica gel, Sylsia #310 (average particle diameter: 1.4 μm) (produced by Fuji Sylsia Kagaku Co., Ltd.) | 5 g |
| Isopropanol | 100 g |
| Ethylene glycol monomethyl ether | 50 g |
| Water | 300 g |

The Bekk smoothness of the thus formed image-receiving layer on the surface side was 105 (sec/10 ml) and the contact angle of water with that surface was 65 degrees.

The original printing plate prepared above underwent image formation with the same laser printer as used in Specimen No. I-2 of Example I-2, thereby preparing a plate-made printing original plate, and then the plate-made printing original plate was irradiated all over for 5 minutes with a 150 W xenon lamp placed in a distance of 15 cm to prepare a lithographic printing plate.

The contact angles of water with the non-image area and the image area of the thus obtained lithographic printing plate were 8 degrees and 95 degrees respectively.

The offset printing was performed using this lithographic printing plate in the same manner as in Specimen No. I-2.

The printed matters obtained by this printing plate had clear images and no scum in the non-image area, similarly to the printed matters from the lithographic printing plate prepared in Specimen No. I-2, and the number of such good-quality printed matters was more than 1,500, namely the press life of the present plate was satisfactorily high.

The image-receiving layer of a lithographic printing original plate according to the present invention comprises anatase-type titanium oxide grains and a polysiloxane resin, and thereby has the contact angle of water with the surface of at least 25 degrees, and then the contact angle is changed to 15 degrees or below by irradiation with ultraviolet light. Accordingly, the present printing original plate can be desensitized in a dry state by irradiation with ultraviolet light, and thereby preparing a lithographic printing plate which can ensure the printing of a great number of scum-free clear printed matters.

Further, the platemaking method according to the present invention enables the easy image formation on the printing original plate utilizing an electrophotographic recording system and the dry-desensitization utilizing ultraviolet irradiation, and can provide a lithographic printing plate which has excellent press life, generates no scum and enables the printing of a great number of clear printed matters free from loss, distortion and blur in the image area.

In the first place, preparation examples of resin particles (PL) for ink are described.

Preparation Example 1

Preparation of Resin Particles (PL-1)

The solution obtained by mixing 7 g of a dispersion stabilizing resin (PS-1) having the structure illustrated below, 100 g of vinyl acetate and 321 g of Isopar H was heated up to 75° C. with stirring in a stream of nitrogen, and thereto was added 1.5 g of 2,2'-azobis(isovaleronitrile) (abbreviated as A.I.V.N.) as polymerization initiator and the resulting mixture was allowed to react for 3 hours. Further, the resulting reaction mixture was admixed with 1.0 g of A.I.V.N., and the reaction was allowed to continue for additional 3 hours. Then, the reaction system was heated up to 100° C., and stirred for 2 hours. As a result, the vinyl acetate unreacted was distilled away. After cooling, the reaction product was passed through 200-mesh nylon cloth. In this polymerization process, the polymerization rate was 93%, and the white dispersion obtained was a highly monodispersed latex having an average particle diameter of 0.42 μm. The average particle diameter was measured with CAPA-500 (made by Horiba Seisakusho K.K.).

Dispersion stabilizing resin (PS-1)

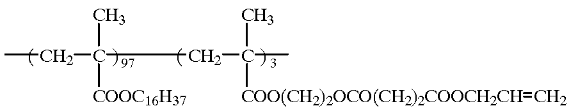

Mw: $4\times10^4$ (Composition Ratio: by Weight)

A part of the foregoing white dispersion was centrifuged (the number of revolutions per minute: $1\times10^4$ rpm, the revolution time: 60 minutes), and the thus precipitated resin-particle were collected and dried. The weight average molecular weight of the resin-particle was $2\times10^5$ (in terms of a polystyrene-covered GPC value) and the glass transition temperature (Tg) thereof was 38° C.

Preparation Example 2

Preparation of Resin Particles (PL-2)

[Production of Dispersion Stabilizing Resin (PS-2)]

The solution obtained by mixing 100 g of octadecyl methacrylate, 0.6 g of divinylbenzene and 200 g of toluene was heated up to 85° C. with stirring in a stream of nitrogen, and thereto was added 4.0 g of 2,2'-azobis(isobutyronitrile) (abbreviated as A.I.B.N.), and the resulting mixture was allowed to react for 4 hours. Further, the reaction mixture was admixed with 1.0 g of A.I.B.N., and the reaction was allowed to continue for 2 hours. Furthermore, the resulting reaction mixture was admixed with 0.5 g of A.I.B.N., and the reaction was allowed to continue for 2 hours. After cooling, the reaction product was poured into 1.5 liter of methanol to separate out a precipitate. The obtained precipitate was filtered off, and dried. Thus, 88 g of a white powder was obtained. The polymer thus-produced has a weight average molecular weight (Mw) of $3.8\times10^4$.

[Preparation of Resin Particles]

The solution obtained by mixing 12 g of the dispersion stabilizing resin PS-2 produced above with 177 g of Isopar H was heated up to 70° C. with stirring in a stream of nitrogen. Thereto, a mixture of 30 g of methyl methacrylate, 70 g of methyl acrylate, 200 g of Isopar G and 1.0 g of A.I.V.N. was dropwise added over a 2-hour period, and the resulting solution was stirred for 2 hours as it was. Further, the resulting reaction solution was admixed with 0.5 g of A.I.V.N., and heated up to 85° C., followed by stirring for 3 hours. After cooling, the reaction product was passed through 200-mesh nylon cloth. In this polymerization procedure, the polymerization rate was 100%, and the white dispersion obtained was a latex having an average particle diameter of 0.38 μm. The average particle diameter was measured with CAPA-500 (made by Horiba Seisakusho K.K.).

The Mw of the thus prepared resin particles was $3\times10^5$, and the Tg thereof was 28° C.

Preparation Example 3

Preparation of Resin Particles (PL-3)

[Production of Dispersion Stabilizing Resin (PS-3)]

The solution obtained by mixing 60 g of octadecyl methacrylate, 40 g of tridecyl acrylate, 3 g of thioglycolic acid, 5.0 g of divinylbenzene and 200 g of toluene was heated up to 85° C. with stirring in a stream of nitrogen, and thereto was added 0.8 g of 1,1'-azobis(cyclohexane-1-carbonitrile) (abbreviated as A.C.H.N.), and the resulting mixture was allowed to react for 2 hours. Further, the reaction mixture was admixed with 0.2 g of A.C.H.N., and the reaction was allowed to continue for 2 hours. After cooling, the reaction mixture was admixed with 15 g of 2-hydroxyethyl methacrylate, and the temperature thereof was adjusted to 25° C. Thereto, the solution obtained by mixing 16 g of dicyclohexylcarbodiimide (abbreviated as D.C.C.), 0.2 g of 4-(N,N-diethylamino)pyridine and 40 g of methylene chloride was dropwise added over a 1-hour period with stirring. Therein, the reaction was allowed to continue for 3 hours. Thus, the reaction was completed. Then, the reaction mixture thus obtained was admixed with 10 g of 80% formic acid, and stirred for 1 hour. Thereafter, the insoluble matter was filtered off, and the filtrate was poured into 2.5 liter of methanol to separate out a precipitate. The obtained precipitate was filtered off, and dissolved in 200 g of toluene. Again, the insoluble matter was filtered off, and the filtrate was poured into 1 liter of methanol to separate out a precipitate. The obtained precipitate was filtered off, and dried. Thus, 70 g of a polymer was obtained, and the weight average molecular weight (Mw) thereof was $4.5\times10^4$.

[Preparation of Resin Particles]

The solution obtained by mixing 8 g of the dispersion stabilizing resin PS-3 produced above with 136 g of Isopar H was heated up to 60° C. with stirring in a stream of nitrogen. Thereto, a mixture of 50 g of methyl methacrylate, 50 g of ethyl acrylate, 200 g of Isopar G and 1.0 g of A.I.V.N. was dropwise added over a 2-hour period, and the resulting solution was stirred for 2 hours as it was. Further, the resulting reaction solution was admixed with 0.5 g of A.I.V.N., and heated up to 80° C., followed by stirring for 3 hours. After cooling, the reaction product was passed through 200-mesh nylon cloth. In this polymerization procedure, the polymerization rate was 100%, and the white dispersion obtained was a latex having an average particle diameter of 0.40 μm.

The Mw of the thus prepared resin particles was $3\times10^5$, and the Tg thereof was 30° C.

Preparation Example 4

Preparation of Resin Particles (PL-4)

The solution obtained by mixing 8 g of a dispersion stabilizing resin (PS-4) having the structure illustrated below, 95 g of vinyl acetate, 5 g of crotonic acid and 324 g of Isopar H was heated up to 70° C. with stirring in a stream of nitrogen, and thereto was added 1.5 g of A.I.V.N. as polymerization initiator, this solution was allowed to react for 3 hours. Further, the resulting reaction mixture was admixed with 0.8 g of A.I.B.N., heated up to 80° C., and the reaction was allowed to continue for additional 3 hours. Furthermore, the reaction mixture was admixed with 0.5 g of A.I.B.N., and the reaction was allowed to continue for 3 hours. After cooling, the reaction product was passed through 200-mesh nylon cloth. In this polymerization process, the polymerization rate was 98%, and the white dispersion obtained was a highly monodispersed latex having an average particle diameter of 0.47 μm.

The Mw of the resin particles thus obtained was $8\times10^4$, and the Tg thereof was 40° C.

Dispersion stabilizing resin (PS-1)

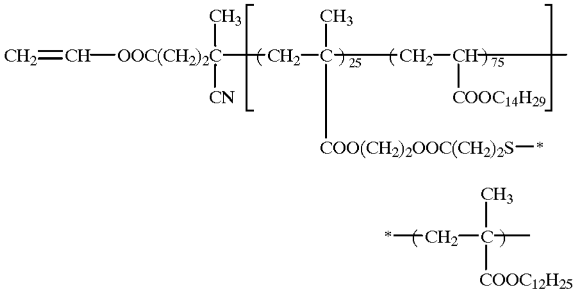

Mw: $4\times10^4$ (Composition Ratio: by Weight)

Example II-1

<Preparation of Lithographic Printing Original Plate>

The following composition, together with glass beads, was placed in a paint shaker (produced by Toyo Seiki K.K.), and dispersed for 60 minutes. Thereafter, the glass beads were filtered out, and a dispersion was obtained.

| <Coating Composition for Image-receiving Layer> | |
|---|---|
| Photocatalyst titanium oxide sol (30% aqueous dispersion, STS-01, produced by Ishihara Sangyo Kaisha Ltd.) | 167 g |
| Colloidal silica, Snowtex C (20% dispersion) (produced by Nissan Chemical Industries Ltd.) | 50 g |
| Methyltrimethoxysilane | 50 g |
| Ethanol | 285 g |

The support of a Model ELP-IX master (trade name, a product of Fuji Photo Film Co., Ltd.) having Bekk smoothness of 1,000 (sec/10 ml) on the under layer side, which is available as an electrophotographic type lithographic printing original plate for small-scale printing, was employed herein. On this support, the dispersion obtained above was coated by means of a wire bar so as to have a dry coverage of 1 g/m$^2$, set to tough, and further heated at 120° C. for 30 minutes to form an image-receiving layer. Thus, a lithographic printing original plate sample was prepared.

The smoothness of this printing original plate was 800 (sec/10 ml), measured using a Bekk smoothness tester (made by Kumagai Riko K.K.) under a condition that the air volume was 10 ml.

In addition, 2 μl of distilled water was put on the surface of this printing original plate, and after a 30-second lapse the contact angle of the water with the plate surface was measured with a surface contact meter (CA-D, trade name, a product of Kyowa Kaimen Kagaku K.K.). The measured value was 55 degrees.

A servo plotter DA 8400, produced by Graphtec Corp., which can draw a picture in accordance with the output of a personal computer, was remodelled so that the pen plotter section was loaded with the ink jet head shown in FIG. 2 and the counter electrode was disposed at a distance of 1.5 mm. On this counter electrode was mounted the lithographic printing original plate sample prepared above, and the print was carried out on this printing original plate sample with the following oil-based ink (IK-1) to perform plate-making. During the plate-making, the under layer provided just under the image-receiving layer of the printing original plate sample was connected electrically to the counter electrode by silver paste. The surface temperature of the plate-made plate was controlled to 70° C. per 10 seconds with a Ricoh Fuser (made by Ricoh Company Ltd.), thereby fixing the ink images.

<Oil-based Ink (IK-1)>

In a paint shaker (made by Toyo Seiki K.K.), 10 g of a copolymer of dodecyl methacrylate and acrylic acid (copolymerization ratio: 95/5 by weight), 10 g of Nigrosine and 30 g of Shellsol 71 were placed together with glass beads, and dispersed for 4 hours. Thus, a fine Nigrosine dispersion was obtained.

A mixture of 20 g (as a solid content) of the resin particles (PL-1) prepared in Preparation Example 1, 7.5 of the foregoing Nigrosine dispersion and 0.08 g of a copolymer of octadecene and half maleic acid octadecylamide was diluted with 1 liter of Isopar G, thereby preparing oil-based black ink.

The drawn images of the printing original plate prepared above were observed under an optical microscope of 200 magnifications, and thereby the image quality was evaluated. As a result, the drawn images were found to be clear and had neither blur nor loss even in the areas of thin lines and fine characters.

Then, the printing original plate was exposed for 3 minutes by means of a 100 W high-pressure mercury lamp placed in a distance of 20 cm.

The surface wettability of the non-image area and that of the image area (solid image area) of the thus obtained lithographic printing plate were evaluated by the contact angle with water. The contact angle of water with the surface of the non-image area was changed to 4 degree, and that of the image area was 90 degrees.

Further, the thus obtained lithographic printing plate was mounted in a printing machine Oliver Model 94 (made by Sakurai Seisakusho K.K.), and the printing was performed on printing papers via the lithographic printing plate using Indian ink for offset printing and a fountain solution prepared by diluting SLM-OD (produced by Mitsubishi Paper Mills, Ltd.) with distilled water by a factor of 100 and placed in a dampening saucer.

The 10th printed matter was picked in the course of printing, and the printed images thereon were evaluated by visual observation via a magnifier of 20 magnifications. The observation result indicated that the non-image area was free from scumming ascribed to the adhesion of printing ink and the uniformity of the solid image area was highly satisfactory. Further, this printed matter was observed under the optical microscope of 200 magnifications. According to this observation, neither blur nor loss were found in the areas of thin lines and fine characters, and the image quality was excellent.

In the aforementioned printing operations, more than 3,000 sheets of printed matter having image quality equal to that of the 10th printed matter were obtained.

Examples II-2

Preparation of Specimen Nos. II-11 to II-16

[Preparation of Waterproof Support]

Wood free paper having a weight of 100 $g/m^2$ was used as a substrate, and the following coating composition for a backcoat layer was coated on one side of the substrate by means of a wire bar to form a backcoat layer having a dry coverage of 12 $g/m^2$. Further, the backcoat layer was subjected to a calender treatment so as to have a smoothness of about 50 (sec/10 ml).

| (Coating Composition for Backcoat Layer) | |
|---|---|
| Kaolin (50% aqueous dispersion) | 200 parts |
| Polyvinyl alcohol (10% aqueous solution) | 60 parts |
| SBR latex (solids content: 59%, Tg: 0° C.) | 100 parts |
| Melamine resin (solids content: 80%, Sumirez Resin SR-613) | 5 parts |

On the other side of the substrate, the coating composition for an under layer, which had one of the formulae II-A to II-F shown in Table II-1, was coated with a wire bar to form an under layer having a dry coverage of 10 $g/m^2$. Further, the under layer was subjected to a calender treatment so as to have a smoothness of about 1,500 (sec/10 ml). The thus prepared six samples of waterproof support were referred to as support samples No. 11 to No. 16 corresponding to the composition formulae II-A to II-F respectively, as shown in Table II-1.

TABLE II-1

| | Composition | | | | |
|---|---|---|---|---|---|
| Formula | Carbon black | Clay | SBR latex | Melamine resin | Support sample No. |
| II-A | 0 | 60 | 36 | 4 | 11 |
| II-B | 5.4 | 54.6 | 36 | 4 | 12 |
| II-C | 7.2 | 52.8 | 36 | 4 | 13 |
| II-D | 9 | 51 | 36 | 4 | 14 |
| II-E | 15 | 45 | 36 | 4 | 15 |
| II-F | 30 | 30 | 36 | 4 | 16 |

The figures in the above table are the solid contents of ingredients, expressed in weight %, in each composition.

<Ingredients of Coating Composition for Under Layer>

Carbon black (30% aqueous dispersion)

Clay (50% aqueous dispersion)

SBR latex (solids content: 50%, Tg: 25° C.)

Melamine resin (solids content: 80%, Sumirez Resin SR-613)

Each set of ingredients were mixed in accordance with its corresponding formula shown in Table II-1, and further admixed with water so as to have a total solid concentration of 25%. Thus, the coating compositions II-A to II-F for the under layer formation were obtained.

The measurement of specific electric resistance of each under layer was carried out in the following manner.

Each of the coating compositions II-A to II-F was applied to a thoroughly degreased and cleaned stainless steel plate at a dry coverage of 10 $g/m^2$ to form a coating film. The thus formed six samples of coating film were each examined for specific electric resistance in accordance with the guard electrode-attached three-terminal method based on JIS K-6911 The measurement results are shown in Table II-2.

TABLE II-2

| Under Layer | Specific Electric Resistance (Ω · cm) |
|---|---|
| II-A | $2 \times 10^{12}$ |
| II-B | $4 \times 10^{9}$ |
| II-C | $1 \times 10^{8}$ |
| II-D | $7 \times 10^{4}$ |
| II-E | $5 \times 10^{3}$ |
| II-F | $4 \times 10^{3}$ |

[Preparation of Lithographic Printing Original Plates]

The dispersion having the following composition was coated on each of the support samples No. 11 to No. 16 at a dry coverage of 2.5 g/$m^2$ to form an image-receiving layer, thereby preparing lithographic printing original plates. Each printing original plate surface had a smoothness of 100 to 115 (sec/10 ml) and the contact angle of water therewith was 50 degrees.

<Coating Composition for Image-receiving Layer>

The following composition, together with glass beads, was placed in a paint shaker (produced by Toyo Seiki K.K.), and dispersed for 30 minutes at the ordinary temperature. Thereafter, the glass beads were filtered out, and a dispersion was obtained.

| | |
|---|---|
| Photocatalyst titanium oxide powder, ST-01 (produced by Ishihara Sangyo Kaisha Ltd.) | 40 g |
| Silica gel, Sylsia #430 (average particle size: 2.5 μm) (produced by Fuji Sylsia Kagaku Co, Ltd.) | 10 g |
| Methyltriacetoxysilane | 30 g |
| Tetraethoxysilane | 20 g |
| 1N Hydrochloric acid | 5 g |
| Water | 560 g |

The image drawing was performed on each of the thus prepared lithographic printing original plate Specimen Nos. II-11 to II-16 by the use of the same ink jet recording system and oil-based ink (IK-1) as in Example II-1, and the ink images were fixed in the same manner as in Example II-1 to prepare printing original plate samples. During the image drawing, the under layer provided just under the image-receiving layer of each printing original plate specimen was connected electrically to the counter electrode by silver paste.

Subsequently, each printing original plate was irradiated with ultraviolet light for 2.5 minutes with the same light source as used in Example II-1 which was placed in a distance of 20 cm. Thus, lithographic printing plate samples were obtained.

The contact angles of water with the non-image area and the image area of each lithographic printing plate were 0 degree and 90 degrees respectively.

Further, each of the thus obtained lithographic printing plates was mounted in an automatic printing machine, AM-2850 (trade name, a product of AM Co. Ltd.), and the printing operations were performed using Indian ink for offset printing machine and a fountain solution prepared by diluting SLM-OD with distilled water by a factor of 50 and placed in a dampening saucer.

Each of the thus obtained lithographic printing plates was examined for image quality of printing plate, image quality of printed matter therefrom and press life. The following criteria are employed for evaluating those qualities.

1) Image Quality of Printing Plate

The drawn images of each lithographic printing plate were observed under an optical microscope of 200 magnifications, and thereby the image quality was evaluated. The capital letters E, G and B in Table II-3 represent the following states respectively.

E . . . The images are very clear, and even thin lines and fine characters have excellent quality.

G . . . The images are clear, and even thin lines and fine characters have good quality.

B . . . There are blur and loss in the areas of thin lines and fine characters, so the image quality is bad.

2) Image Quality of Printed Matter

The quality of images printed from each lithographic printing plate (abbreviated as "print quality" hereinafter) was evaluated in the same manner as in the above item 1). The capital letters E, G and B in Table II-3 represent that the printed matters are in the same states as mentioned above respectively.

3) Press Life

The press life is expressed in terms of the number of scum-free or image loss-free printed matters obtained from each lithographic printing plate. The terms scum and image loss used herein signify those detectable by visual observation.

The evaluation results are shown in Table II-3.

TABLE II-3

| Specimen No. | Support sample | Image quality of printing plate | Image quality of printed matter | Press life |
|---|---|---|---|---|
| II-12 | No. 12 | G | G | 1,500 |
| II-13 | No. 13 | E | E | 3,000 |
| II-14 | No. 14 | E | E | 3,000 |
| II-15 | No. 15 | E | E | 3,000 |
| II-16 | No. 16 | E | E | 3,000 |
| II-11 | No. 11 | B | B | 50 |

As is apparent from the results of Table II-3, the present lithographic printing plates achieved satisfactory results with respect to image quality of printed matter as well as image quality of printing plate.

Further, the results shown in Table II-3 are considered in some detail by reference to the values of specific electric resistance shown in Table II-2.

In specimen Nos. II-12 to II-16, the under layer of each support had low specific electric resistance, specifically ranging from $10^9$ to $10^3$ Ω·cm; as a result, the images formed were clear, even the thin lines and fine characters had good quality, and the press life attained was high.

On the other hand, in Specimen No. II-1, the under layer had specific electric resistance of higher than $10^{12}$ Ω·cm; as a result, image blur and loss were caused. In addition, the blur thinned down the resin layer of drawn images to lower the press life.

In other words, the results obtained indicate that the drawn image quality of printing plate and the image quality of printed matter are better the higher conductivity the under layer provided just under the image-receiving layer have.

Example II-3

<Preparation of Lithographic Printing Original Plate>

The following composition, together with glass beads, was placed in a paint shaker (produced by Toyo Seiki K.K.), and dispersed for 10 minutes. Thereafter, the glass beads were filtered out, and a dispersion was obtained.

| <Coating Composition for Image-receiving Layer | |
|---|---|
| Photocatalyst titanium oxide sol (30% aqueous dispersion), STS-02 (produced by Ishihara Sangyo Kaisha Ltd.) | 133 g |
| Colloidal silica, Snowtex C (20% dispersion) (produced by Nissan Chemical Industries Ltd.) | 25 g |
| γ-Methacryloxypropyltrimethoxysilane | 25 g |
| Isopropanol | 160 g |
| Water | 144 g |

The above dispersion and the following composition, together with glass beads, were placed in a paint shaker (produced by Toyo Seiki K.K.), and dispersed for 30 minutes. Therefore, the glass beads were filted out, and a coating composition was obtained.

| | |
|---|---|
| Tetra(t-butoxy)titanium | 10 g |
| Acetyl acetone | 1.5 g |
| Isopropanol | 18 g |
| Ethylene glycol | 7 g |
| Tetrahydroxyfuran | 7 g |
| 4,4-azobis(4-cyanovaleric acid) | 0.1 g |

On the same waterproof support as used in Specimen No. II-12 of Example II-2, the above composition was coated with a wire bar, set to touch, and further dried at 130° C. for 60 minutes to form an image-receiving layer at a dry coverage of 2 g/$m^2$. Thus, a lithographic printing original plate was prepared. The Bekk smoothness of this printing original plate on the surface side was 850 (sec/10 ml) and the contact angle of water therewith was 55 degrees.

In the same manners as in Example II-1, the images were drawn on this printing original plate with the oil-based ink (IK-2) having the following composition, and the resulting printing original plate was subjected to fixation and ultraviolet irradiation treatments to prepare a lithographic printing plate, followed by offset printing.

<Preparation of Oil-based Ink (IK-2)>

In a paint shaker (made by Toyo Seiki K. K.), 10 g of a copolymer of dodecyl methacrylate and methacrylic acid (copolymerization ratio: 95/5 by weight), 10 g of Alkali Blue and 30 g of Isopar H were placed together with glass beads, and dispersed for 4 hours. Thus, a fine Alkali Blue dispersion was obtained.

A mixture of 45 g (as a solid content) of the resin particles (PL-2) prepared in Preparation Example 2, 18 g of the foregoing Alkali Blue dispersion and 0.16 g of a copolymer of octyl vinyl ether and half maleic acid octadecylamide was diluted with 1 liter of Isopar G, thereby preparing oil-based blue ink.

The printed matters obtained from the present lithographic printing plate had clear images and no scum in the non-image area, similarly to those from the lithographic printing plate made in Example II-1, and the number of such good-quality printed matters was more than 3,000, namely the press life of the present printing plate was satisfactorily high.

Examples II-4 to II-10

Lithographic printing original plates were prepared in the same manner as in Example II-1, except that the compounds shown in Table II-4 were each used in an amount of 0.37 mole instead of the methyltrimethoxysilane in the coating solution for the image-receiving layer.

TABLE II-4

| Example | Silyl Compound |
|---|---|
| II-4 | Butyltrimethoxysilane |
| II-5 | 3-Glycidoxypropyltrimethoxysilane |
| II-6 | 3-Hydroxypropyltrimethoxysilane |
| II-7 | Phenyltrimethoxysilane/propyltrimethoxysilane (4/6 by mole) mixture |
| II-8 | Vinyltris(2-methoxyethoxy)silane/ triethoxysilane (3/7 by mole) mixture |
| II-9 | Dimethyldimethoxysilane/methyltripropoxysilane (1/1 by mole) mixture |
| II-10 | 3-Mercaptopropyltri(2-methoxyethoxy)silane/ ethyltrimethoxysilane (4/6 by mole) mixture |

The thus prepared printing original plates each had Bekk smoothness of not lower than 800 (sec/10 ml) on the surface side, and the contact angle of water with that surface was not lower than 50 degrees.

In the same manners as in Example II-1, the images were formed on each printing original plate and the resulting printing plate was subjected to fixation and ultraviolet irradiation treatments to prepare a lithographic printing plate, followed by offset printing.

The printed matters obtained from each of the lithographic printing plates had clear images and no scum in the non-image area, similarly to those from the lithographic printing plate made in Example II-1, and the number of such good-quality printed matters was more than 3,000, namely the press life of the present printing plate was satisfactorily high.

Example II-11

<Preparation of Lithographic Printing Original Plate>

The following composition, together with glass beads, was placed in a paint shaker (produced by Toyo Seiki K.K.), and dispersed for 20 minutes. Thereafter, the glass beads were filtered out, and a dispersion was obtained. This dispersion was coated on a 100 μm-thick aluminum plate provided with a 2 μm-thick hardened gelatin film at a dry coverage of 2 g/$m^2$ by means of a wire bar, and set to tough.

Further, the thus dried coating was heated at 150° C. for 30 minutes, thereby preparing a lithographic printing original plate.

| <Coating Composition for Image-receiving Layer> | |
|---|---|
| Photocatalyst titanium oxide sol, STS-02 (produced by Ishihara Sangyo Kaisha Ltd.) | 50 g (as solid content) |
| Benzyltrimethoxysilane | 60 g |
| Alumina sol 520 (produeced by Nissan Chemical Industries Ltd.) | 10 g (as solid content) |
| Silica gel, Sylsia #310 (average particle diameter: 1.4 μm) (produced by Fuji Sylsia Kagaku Co., Ltd.) | 5 g |
| Isopropanol | 100 g |
| Ethylene glycol monomethyl ether | 50 g |
| Water | 300 g |

The Bekk smoothness of the thus formed image-receiving layer on the surface side was 350 (sec/10 ml) and the contact angle of water with that surface was 65 degrees.

The printing original plate prepared above was subjected to plate-making and fixation treatments in the same manners as in Example II-1, except that the oil-based ink (IK-3) having the following composition was used instead of the oil-based ink (IK-1), thereby preparing a printing plate.

<Oil-based Ink (IK-3)>

A mixture of 300 g of the white dispersion (PL-4) as a latex prepared in Preparation Example 4 with 5 g of Victoria Blue B was heated up to 100° C., and stirred for 4 hours under heating. After cooling to room temperature, the resulting mixture was passed through a 200-mesh nylon cloth to remove the residual dye. Thus, a blue resin dispersion having an average particle diameter of 0.47 μm was obtained.

A mixture of 260 g of the blue resin dispersion prepared above, 0.07 g of zirconium naphthenate and 20 g of hexadecyl alcohol, FOC-1600 (produced by Nissan Chemical Industries, Ltd.) was diluted with 1 liter of Shellsol 71 to prepare oil-based blue ink.

Then, the printing original plate was irradiated all over for 5 minutes by means of a 150 W xenon lamp placed in a distance of 10 cm to be made into a lithographic printing plate.

The contact angles of water with the non-image area and the image area of the thus made lithographic printing plate were 0 degree and 95 degrees respectively.

The offset printing was performed using this lithographic printing plate in the same manner as in Example II-1.

The printed matters obtained from this printing plate had clear images and no scum in the non-image area, similarly to the printed matters from the lithographic printing plate made in Example II-1, and the number of such good-quality printed matters was more than 10,000, namely the press life of the present printing plate was satisfactorily high.

Example II-12

A lithographic printing original plate was prepared in the same manner as in Example II-11, except that the corona-processed 100 μm-thick PET film was used as the waterproof support. Also, in the same manners as in Example II-11, the images were drawn on this printing original plate and the resulting plate was subjected to fixation and ultraviolet irradiation treatments to prepare a lithographic printing plate, followed by offset printing.

In the image drawing, however, the oil-based ink (IK-4) having the following composition was used in place of the oil-based ink (IK-3).

<Oil-based Ink (IK-4)>

A mixture of 500 g of the white dispersion (PL-3) prepared in Preparation Example 3 with 7.5 g of Sumikalon Black was heated up to 100° C., and stirred for 6 hours under heating. After cooling to room temperature, the resulting mixture was passed through a 200-mesh nylon cloth to remove the residual dye. Thus, a black resin dispersion having an average particle diameter of 0.40 μm was obtained.

The printed matters obtained from this printing plate had clear images and no scum in the non-image area, similarly to the printed matters from the lithographic printing plate made in Example II-11, and the number of such good quality printed matters was more than 10,000, namely the press life of the present printing plate was very high.

The image-receiving layer of a lithographic printing original plate according to the present invention comprises anatase-type titanium oxide grains and a polysiloxane resin, and thereby has the contact angle of water with the surface thereof of at least 25 degrees and then the contact angle is changed to 15 degrees or below by irradiation with ultraviolet light. Accordingly, the present printing original plate can be desensitized in a dry state by irradiation with ultraviolet light, and thereby made into a lithographic printing plate which can ensure the printing of a great number of scum-free clear printed matters.

Further, the platemaking method according to the present invention enables the easy image formation on the printing original plate utilizing an ink jet recording system and the dry-desensitization utilizing ultraviolet irradiation, and can provide a lithographic printing plate which has excellent press life, generates no scum and enables the printing of a great number of clear printed matters free from loss, distortion and blur in the image area.

While the invention has been described in detail and with reference to specific embodiments thereof, it will be apparent to one skilled in the art that various changes and modifications can be made therein without departing from the spirit and scope thereof.

What is claimed is:

1. A lithographic printing plate precursor consisting essentially of a waterproof support having thereon an image-receiving layer, wherein said image-receiving layer consists essentially of at least anatase-type titanium oxide grains and a resin having a siloxane bond in which silicon atoms are linked via an oxygen atom, the surface of said image-receiving layer has at least 25 degrees of contact angle with water and the contact angle with water is reduced to 15 degrees or below when it is irradiated with ultraviolet light.

2. The lithographic printing plate precursor as in claim 1, wherein said image-receiving layer has a surface smoothness of at least 30 seconds/10 ml in the term of a Bekk smoothness degree.

3. The lithographic printing plate precursor as in claim 1, wherein said image-receiving layer is a layer formed from a dispersion containing anatase-type titanium oxide particles and at least one silyl compound represented by formula (I) with a sol-gel method:

$$(R^0)_nSi(Y)_{4-n} \qquad (I)$$

wherein $R^0$ represents a hydrocarbon group or a heterocyclic group; Y represents a hydrogen atom, a halogen atom, $—OR^1$, $—OCOR^2$ or $—N(R^3)(R^4)$, wherein $R^1$ and $R^2$ are each a hydrocarbon group, and $R^3$ and $R^4$ may be the same or different, each represents a hydrogen atom or a hydrocarbon group; and n is 0, 1, 2 or 3.

4. The lithographic printing plate precursor as in claim 1, which is a printing original plate for forming an image with an electrophotographic recording system.

5. The lithographic printing plate precursor as in claim 1, which is a printing original plate for forming an image with an ink jet recording system.

6. The lithographic printing plate precursor as in claim 4, wherein the waterproof support has a specific electric resistance of from $10^4$ to $10^{13}$ Ω·cm in the part just under the image-receiving layer.

7. The lithographic printing plate precursor as in claim 5, wherein the waterproof support has a specific electric resistance of pot higher than $10^{10}$ Ω·cm in the part just under the image-receiving layer.

* * * * *